(12) United States Patent
Morgenstern et al.

(10) Patent No.: US 7,475,848 B2
(45) Date of Patent: Jan. 13, 2009

(54) WING EMPLOYING LEADING EDGE FLAPS AND WINGLETS TO ACHIEVE IMPROVED AERODYNAMIC PERFORMANCE

(76) Inventors: John M. Morgenstern, 42411 52nd St. West, Lancaster, CA (US) 93536; Alan E. Arslan, 28298 Bockdale, Santa Clarita, CA (US) 91387

( * ) Notice: Subject to any disclaimer, the term of this patent is extended or adjusted under 35 U.S.C. 154(b) by 391 days.

(21) Appl. No.: 11/059,756

(22) Filed: Feb. 16, 2005

(65) Prior Publication Data
US 2007/0262207 A1 Nov. 15, 2007

Related U.S. Application Data

(63) Continuation-in-part of application No. 10/706,671, filed on Nov. 11, 2003, now abandoned.

(51) Int. Cl.
*B64C 3/00* (2006.01)
(52) U.S. Cl. .................. 244/35 R; 244/199.4; 244/214; 244/216; 244/123.1
(58) Field of Classification Search .............. 244/34 R, 244/35 R, 36, 37, 39, 198, 199.1–199.4, 45 R, 244/46, 47, 48, 51, 52, 119, 123.1, 214, 216
See application file for complete search history.

(56) References Cited

U.S. PATENT DOCUMENTS

| | | | | |
|---|---|---|---|---|
| 1,011,767 A | * | 12/1911 | Farum | 244/35 R |
| 1,063,805 A | * | 6/1913 | Krause | 244/198 |
| 1,710,673 A | * | 4/1929 | Bonney | 244/215 |
| 2,210,642 A | * | 8/1940 | Thompson | 244/35 R |
| 2,576,981 A | * | 12/1951 | Vogt | 244/91 |
| 2,846,165 A | * | 8/1958 | Axelson | 244/90 R |
| 3,411,738 A | * | 11/1968 | Sargent | 244/199.2 |
| 3,469,807 A | * | 9/1969 | Morris, Jr. | 244/90 R |
| 4,108,403 A | * | 8/1978 | Finch | 244/199.2 |
| 4,247,062 A | * | 1/1981 | Brueckner | 244/91 |
| 4,293,110 A | * | 10/1981 | Middleton et al. | 244/199.1 |
| 4,382,569 A | * | 5/1983 | Boppe et al. | 244/199.4 |
| 4,538,779 A | * | 9/1985 | Goldstein | 244/87 |
| 4,545,552 A | * | 10/1985 | Welles | 244/90 R |
| 4,598,885 A | * | 7/1986 | Waitzman | 244/13 |
| 4,722,499 A | * | 2/1988 | Klug | 244/199.4 |
| 4,828,204 A | * | 5/1989 | Friebel | 244/15 |

(Continued)

OTHER PUBLICATIONS

"Autopilot." Wikipedia, The Free Encyclopedia. Sep. 7, 2006, 01:03 UTC. Wikimedia Foundation, Inc. Sep. 12, 2006 <http://en.wikipedia.org/w/index.php?title=Autopilot&oldid=74243433>.*

(Continued)

*Primary Examiner*—J. Woodrow Eldred

(57) ABSTRACT

A wing for use on a supersonic aircraft that includes an inboard section a central section of the wing outboard of the inboard portion, and an outboard section. The outboard section can be a winglet oriented anhedrally relative to a lateral axis of the supersonic aircraft. Leading edge segments on the inboard section, central section and outboard winglet may have mounted thereon leading-edge flaps. These flaps are adjusted by a control system operable to reposition the leading-edge flaps in order to improve the aerodynamic performance of the supersonic aircraft. This winglet promotes sonic boom minimization. Further, the wing tip anhedral allows greater inboard dihedral. This effectively pushes lift aft for sonic boom and control purposes while minimizing the movement of control surfaces.

12 Claims, 24 Drawing Sheets

U.S. PATENT DOCUMENTS

| | | | | |
|---|---|---|---|---|
| 4,975,022 | A * | 12/1990 | Perry | 416/228 |
| 5,072,894 | A * | 12/1991 | Cichy | 244/91 |
| 5,078,338 | A * | 1/1992 | O'Neill et al. | 244/47 |
| 5,156,358 | A * | 10/1992 | Gerhardt | 244/36 |
| 5,267,626 | A * | 12/1993 | Tanfield, Jr. | 180/117 |
| 5,634,613 | A * | 6/1997 | McCarthy | 244/199.1 |
| 5,897,076 | A * | 4/1999 | Tracy | 244/117 A |
| 5,992,793 | A * | 11/1999 | Perry et al. | 244/17.11 |
| 6,149,101 | A * | 11/2000 | Tracy | 244/130 |
| 6,422,518 | B1 * | 7/2002 | Stuff et al. | 244/199.2 |
| 6,722,615 | B2 * | 4/2004 | Heller et al. | 244/199.4 |
| 6,827,314 | B2 * | 12/2004 | Barriety | 244/201 |
| 7,070,148 | B2 * | 7/2006 | Wyrembek et al. | 244/113 |
| 7,100,867 | B2 * | 9/2006 | Houck, II | 244/34 A |
| 2005/0045763 | A1 | 3/2005 | Morgenstern et al. | |
| 2005/0184196 | A1 * | 8/2005 | Shmilovich et al. | 244/199 |

OTHER PUBLICATIONS

Arliners.net "Tech Ops: Slats & Krueger Flaps", Jul. 2005.*
"Supersonic." Wikipedia, The Free Encyclopedia. May 19, 2007, 17:04 UTC. Wikimedia Foundation, Inc. May 26, 2007 <http://en.wikipedia.org/w/index.php?title=Supersonic&oldid=132033522>.*
The American Heritage® Dictionary of the English Language, Fourth Edition Copyright © 2007, 2000 by Houghton Mifflin Company. Updated in 2007. Published by Houghton Mifflin Company.*

* cited by examiner

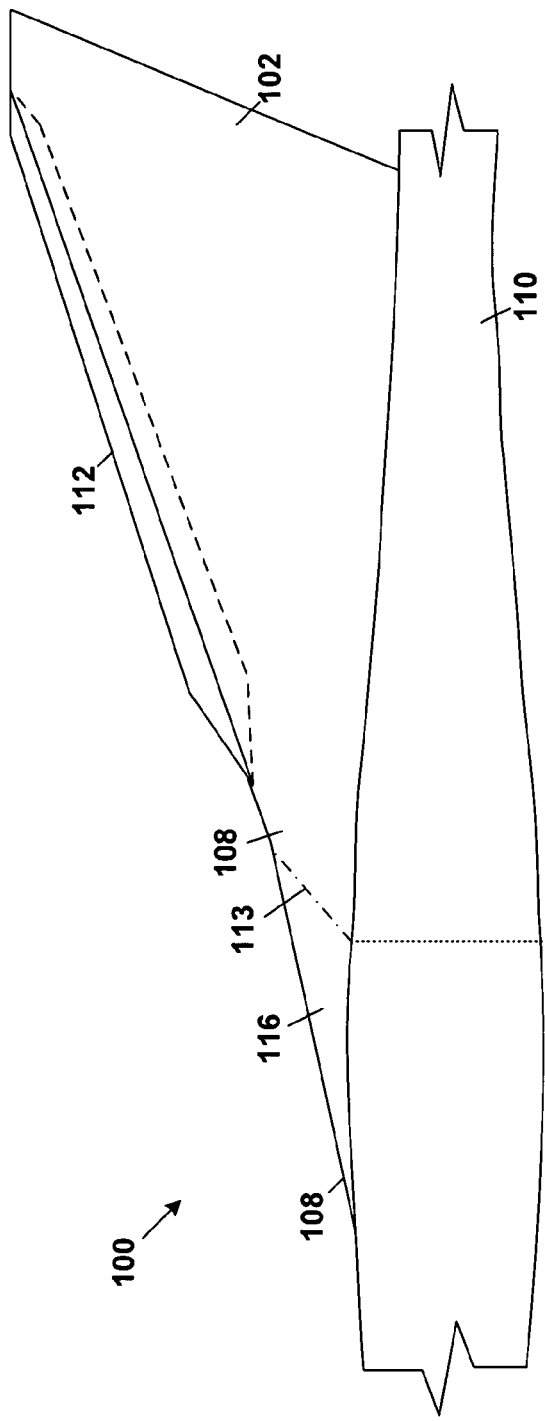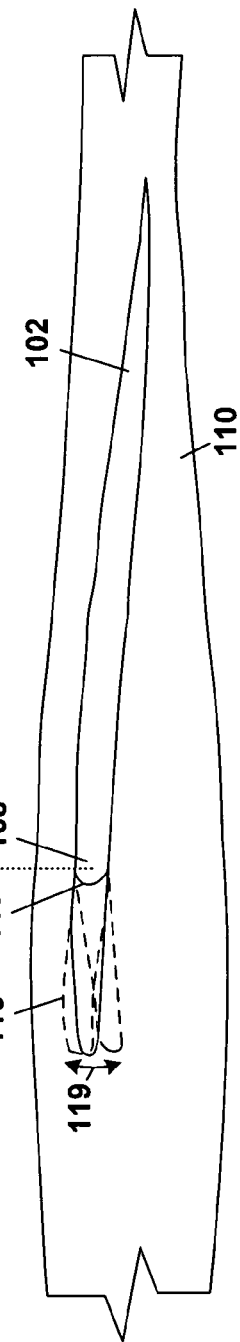
FIG. 2D
FIG. 2E

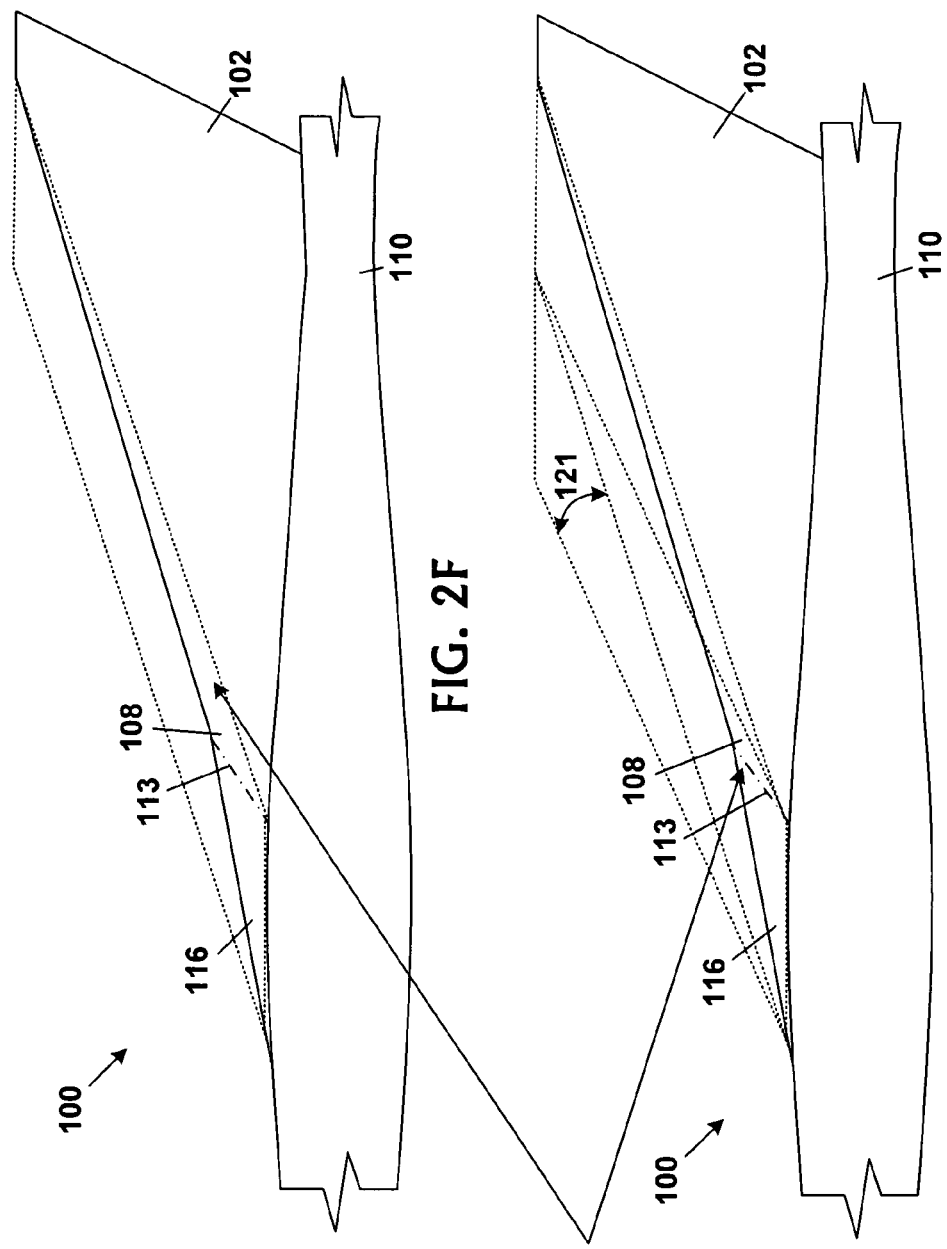

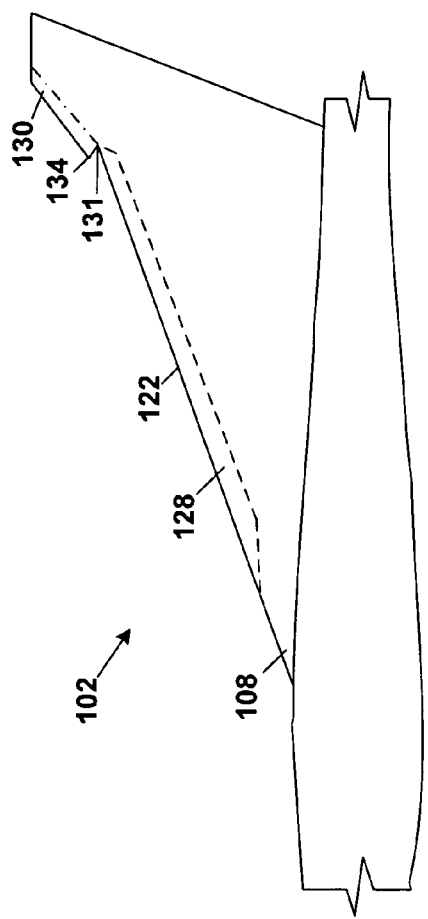
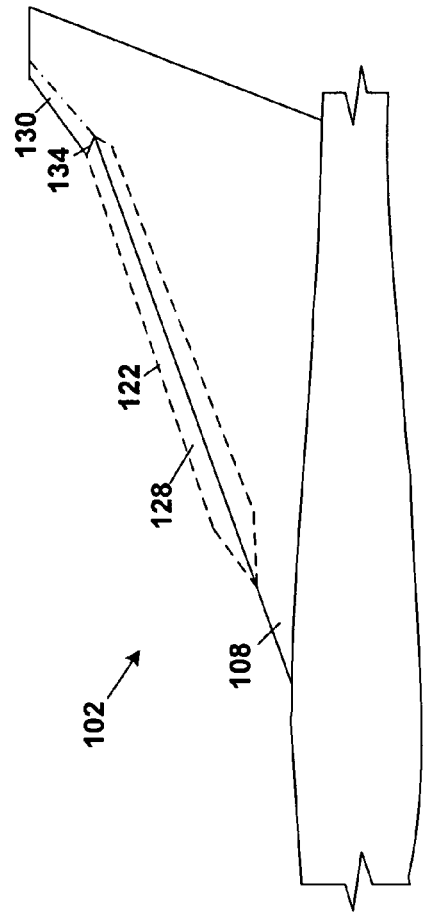
FIG. 3B
FIG. 3C

WING EMPLOYING LEADING EDGE FLAPS AND WINGLETS TO ACHIEVE IMPROVED AERODYNAMIC PERFORMANCE

BACKGROUND OF THE INVENTION

Air travelers have long sought the convenience and efficiency of widespread supersonic commercial aviation only to be denied by technological, economic, and political roadblocks. With operations spanning over a quarter of a century, the Concorde remains the only commercial aircraft that travels at supersonic speeds but struggles with technological obsolescence. Fuel consumption and maintenance requirements of the Concorde strain commercial feasibility in today's competitive environment. Possibly overshadowing other technological and economic shortcomings is the Concorde's thunderous sonic boom that is highly annoying due to its perceived loudness and startle, a burden that restricts the Concorde's supersonic operations to primarily oceanic routes.

The sonic boom imposes many practical limitations for commercial supersonic aviation as annoyance with sonic boom loudness and startle results in the prohibition of commercial supersonic aircraft operations over most populated landmasses.

A sonic boom occurs due to pressure waves that form when an aircraft moves at supersonic speeds. As the aircraft approaches supersonic speeds, air at the leading edge of the configuration compresses to a non-linear threshold where discontinuities in flow properties, manifest through a pressure pulse and propagated through the atmosphere. Pressure pulse intensity decreases as a consequence of propagation through the atmosphere and changes shape into an N-shaped wave within which pressure rises sharply, gradually declines, and then rapidly returns to ambient atmospheric pressure. A wall of compressed air that moves at aircraft speed spreads from the wave and, in passing over ground is heard and felt as a sonic boom. Rapid changes in pressure at the beginning and end of the N-wave produce the signature double bang of the sonic boom.

Research has demonstrated that boom intensity can be reduced by altering aircraft shape, length, and weight. An aircraft that is long in proportion to weight spreads the overpressure across a greater distance, resulting in a lower peak pressure. Furthermore, wings that are spread along the body and not concentrated in the center as in a conventional aircraft have a greater lifting length and produce a pressure pulse that is similarly spread, resulting in a smaller sonic boom.

One technique for boom reduction is shaping. Shaping alters source pressure disturbance such that a non-N-wave shape is imposed on the ground. Shaping can reduce loudness by 15-20 dB or more with no added energy beyond that to sustain flight. Minimizing loudness is based on insight regarding changes in aircraft pressure disturbances during propagation to the ground. During the sixties and seventies, Jones, Seebass, George, and Darden developed a practical analytical guideline for low boom design.

Studies have shown that sonic boom loudness at audible frequencies correlates with annoyance. Therefore supersonic over land flight could only be achieved by reducing the sonic boom to acceptable sound levels. Shaped sonic booms are only achieved deliberately. No existing aircraft creates a shaped sonic boom that persists for more than fraction of the distance to the ground while flying at an efficient cruise altitude, since non-shaped pressure distributions quickly coalesce into the fundamental N-wave shape. Audible frequencies for a sonic boom occur wherever pressure changes rapidly, essentially at the beginning and end of a typical N-waveform. Shocks become quieter at decreasing magnitudes and increasing rise times of the pressure change. The N-wave form generates the largest possible shock magnitude from a particular disturbance. On average the front of a supersonic aircraft generates an increase from ambient pressure while the rear generates a decrease in pressure. The disturbances stretch and also coalesce because shocks travel at speeds that vary in proportion to the magnitudes of the local pressure. Higher pressures travel faster moving forward and coalescing into a single front shock, and likewise, the aft low pressures coalesce into a single rear shock. Variation in propagation speed stretches the disturbance during propagation to the ground to two to three times the vehicle length—very significant stretching. Shaped boom techniques typically attempt to prevent coalescing of the pressure disturbance by adding a large compression at the aircraft nose and an expansion at the tail with pressure between constrained to very weak compression and expansion, with correspondingly slow coalescence speeds. The shaped boom stretches the ends of the signature faster than the in-between pressures, stretching without coalescing and creating a non-N-wave sonic boom at the ground. The vehicle's pressure distribution is constrained to this particular George-Seebass-Darden shape that produces the minimum shock strength possible through the least coalescence possible.

SUMMARY OF THE INVENTION

What are desired are wings and lift devices that facilitate sonic boom reduction and enable good off-design performance and control characteristics.

Some embodiments disclosed herein teach a wing for use on a supersonic aircraft that includes an inboard section a central section of the wing outboard of the inboard portion, and an outboard section. The outboard section can be a winglet oriented anhedrally relative to a lateral axis of the supersonic aircraft. Leading edge segments on the inboard section, central section and outboard winglet may have mounted thereon leading-edge flaps. These flaps are adjusted by a control system operable to reposition the leading-edge flaps in order to improve the aerodynamic performance of the supersonic aircraft. This winglet promotes sonic boom minimization. Further, the wing tip anhedral allows greater inboard dihedral. This effectively pushes lift aft for sonic boom and control purposes while minimizing the movement of control surfaces.

In further embodiments, the outboard lower sweep section has the same dihedral angle as the inboard portions of the wing. This embodiment shifts the aircraft's aerodynamic center and center of pressure aft. This shift aft helps achieve a minimized sonic boom according to the methodology of George-Seebass-Darden and prior patent U.S. patent application Ser. No. 10/006,505, entitled Tail-Braced Wing Aircraft and Configurations for Achieving Long Supersonic Range and Low Sonic Boom, which is hereby incorporated by reference. It also results in lower induced drag at the cruise Mach number because the outboard section can trap all the upwash generated by the inboard wing, behind the Mach cone angle but ahead of the inboard wing leading edge. This makes the outboard wing a more efficient place to generate lift than otherwise possible. Integrating this outboard with sonic boom minimization, by keeping the equivalent area less than or equal to the George-Seebass-Darden ideal equivalent area definition, allows the aft load needed for minimization to be met with less induced drag. The tip of the outboard wing may have a leading edge flap or all-moving tip for roll control with less aeroelastic effectiveness loss due to twist, especially supersonically.

The outboard lower sweep section might also have a discontinuous increase in chord and dog-toothed leading edge break. This sharp leading edge extended forward can have a leading edge flap with its hingeline aligned with the center wing round leading edge, allowing deflections of the flap to be made without steps being created with the center wing.

Another embodiment employs a winglet having anhedral of about 30 degrees, typically outboard of the fuel extent. The resulting winglet's closer proximity to the ground intensifies the ground effect increasing lift, reducing drag and resulting in improved take-off performance. Further, George-Seebass-Darden minimization requires the aircraft lift to be carried aft, and because the Mach cone angle moves farther aft the higher the lift is carried vertically, dihedral raises the height of the wing as one goes outboard. Unfortunately, too much dihedral makes the aircraft roll during sideslip. To maximize the height of the wing for sonic boom minimization without saturating roll control during sideslip, the wing should have higher inboard dihedral and an anhedraled wing tip. The tip takes advantage of its greater moment arm to counter the roll from greater inboard dihedral. By making greater inboard dihedral controllable, this anhedraled winglet improves sonic boom minimization. In addition, the winglet can capture a little more of the shock wave coming off the nacelle for drag reduction. Additional embodiments may incorporate an all-moving winglet with a rotational axis in the dihedral plane of the wing, to control roll with reduced aeroelastic effectiveness loss. This is especially true when operating supersonically. Such an all-moving winglet also results in less adverse yaw during roll conditions. High reliability actuators, like dual-tandem, can be housed in a streamwise upper surface wing bulge to avoid interference with the winglet and nacelle. Upper surface actuators with hinges located at the lower surface allow large hinge radii on the upper surface, where it is more useful for keeping control surface flow attached. The winglet incidence can be changed when the Mach number is changed from the design point to maximize drag reduction.

Another embodiment employs a winglet having a dihedral of −60 to −90 or about +90 degrees. This winglet or a portion thereof may rotate about an axis perpendicular to the plane of the inboard portions of the wing. The actuator can be placed in the axis of the wing spars. This embodiment allows increased yaw control from aft placed sideforces, and contributing drag differentials at the winglets due to the winglets or a combination of the winglets and ailerons. It could be possible to reduce or eliminate a larger center fin and rudder.

The inboard section of the wing may have a higher leading edge sweep that is adjusted to fill-in the typical dip that occurs in the equivalent area just ahead of the wing. The spanwise extent of this higher swept region can be limited to the first 20 to 30 percent of span where a leading edge flap is not typically needed, to allow for a straighter leading edge flap. This higher inboard sweep can be separate or combined with the previous outboard wing sections. A canard can also be used with or without the higher inboard sweep to fill-in the typical dip that occurs in the equivalent area just ahead of the wing.

In one embodiment, the leading-edge flap of the central section of the wing is a Krueger flap and the leading-edge flap of the outboard winglet is a simple leading-edge flap. The leading edge flaps can increase aft lift, reduce trim and vortex drag, and reduce the sonic boom signature of the supersonic aircraft. The outboard winglet can increase ground effect during take off and can provide positive wave drag interference with the nacelle. The leading edge flap of the outboard winglet can also provide roll control at supersonic conditions and directional control with proverse roll effects. Some embodiments may further include trailing-edge flaps on one or more sections, wherein the leading edge flaps are controlled in conjunction with the trailing edge flaps to reduce drag while cruising subsonically. Additionally, the control system coupled to the leading-edge flaps can adjust the leading-edge flaps to improve aerodynamic flow fields for flight at Mach numbers different from the Mach number to which the aircraft design is optimized.

Another embodiment more specifically claims an aircraft wing capable of coupling to an aircraft fuselage and having a leading edge, the wing extends inboard to outboard. A strake couples to the aircraft fuselage and extends to the leading edge of the wing. In some embodiments the strake further includes a leading-edge flap. A Krueger flap couples to the leading edge of an inboard portion of the wing adjacent the strake. If present, the strake leading-edge flap operates as a leading-edge device to create an airflow field impinging on the Krueger flap to reduce or eliminate inboard vortices in an upper surface airflow field. The outboard winglet may have a simple leading edge flap coupled to its leading edge, wherein the outboard winglet is anhedrally oriented relative to a lateral axis of the aircraft, and wherein its leading edge flap provides roll control and directional control for the aircraft.

The wing and strake form a swept wing that extends with at least one sweep angle from the fuselage. In fact, the wing and strake may form a swept wing that extends in a plurality of sweep angle segments from the fuselage. The sweep angle of the inboard portion of the wing differs from the sweep angle of the strake and outboard winglet. As in the previous embodiment, the outboard winglet increases ground effect during take off provides positive wave drag interference with the nacelle. The wing may further employ trailing-edge flaps on one or more sections, wherein the leading edge flaps are positioned in conjunction with the trailing edge flaps by a control system to reduce drag at subsonic cruise conditions. By themselves, the leading edge flaps increase aft lift, reduce trim and vortex drag, and reduce the sonic boom signature of the supersonic aircraft. Furthermore, the control system coupled to the leading-edge flaps allows the flaps to be adjusted to improve aerodynamic flow fields for flight at Mach numbers different from the Mach number to which the aircraft design is optimized.

Wing control surfaces, flaps, tails and canards can be used to meet sonic boom minimization requirements. By using movable surfaces to alter the lift distribution to meet sonic boom minimization requirements, resulting drag penalties do not have to be incurred wherever low sonic boom is not required, like over water. Since maximum range is generally most important over water, using movable surfaces for sonic boom minimization can reduce the drag penalty associated with reducing sonic boom.

BRIEF DESCRIPTION OF THE DRAWINGS

Embodiments of the invention relating to both structure and method of operation may best be understood by referring to the following description and accompanying drawings.

FIGS. 2A-2G are schematic pictorial diagrams respectively illustrating side, top, and three-dimensional perspective views of an embodiment of an aircraft leading-edge flap;

FIGS. 3A-3C depict embodiments of the wing used with the disclosed airfoil;

DETAILED DESCRIPTION OF THE EMBODIMENTS

Preferred embodiments of the present invention are illustrated in the FIGURES, like numerals being used to refer to like and corresponding parts of the various drawings.

Figure 1:
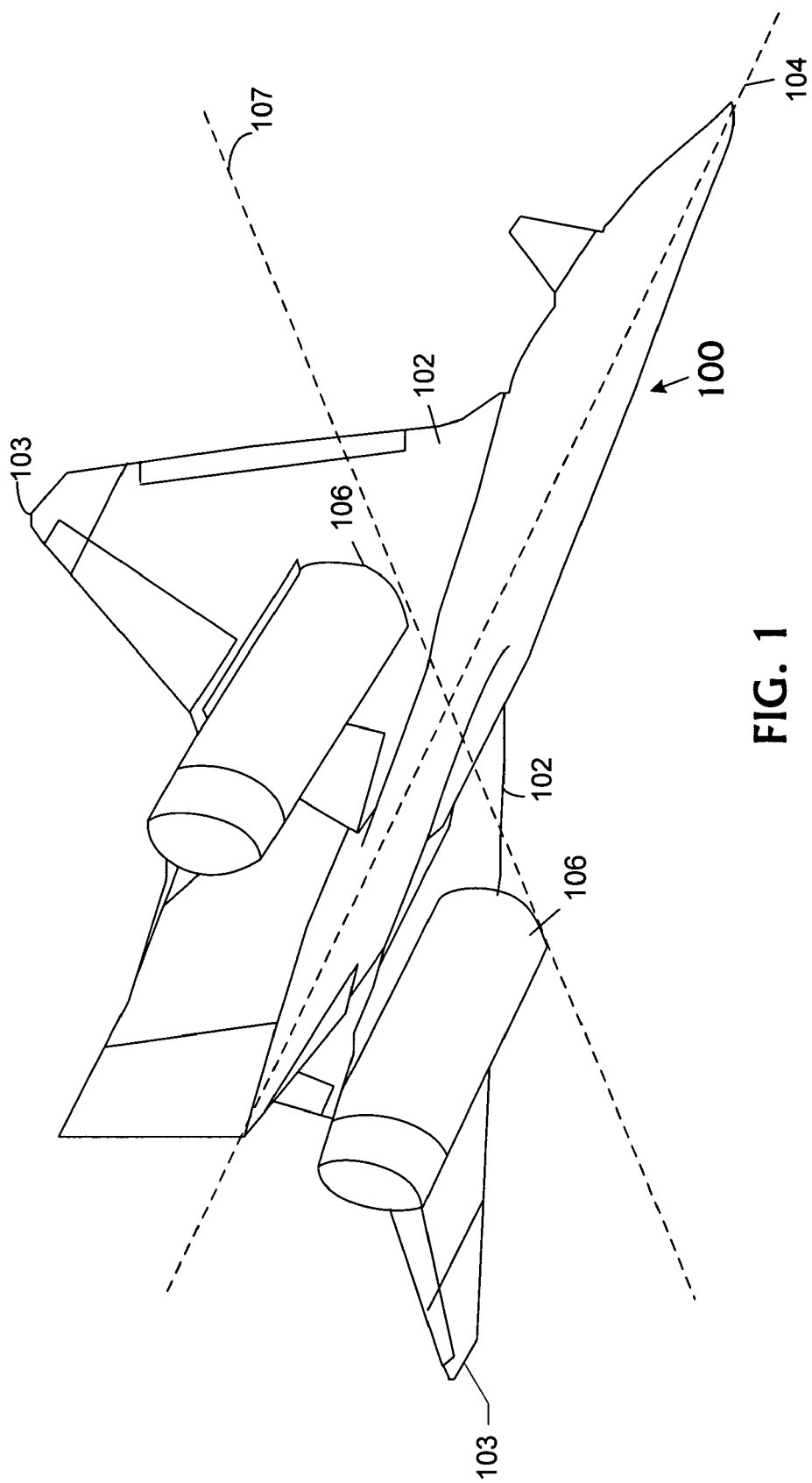
FIG. 1 provides a pictorial diagram of an aircraft employing some of the teachings of the disclosure.

FIG. 1 illustrates an example of an aircraft 100 having a longitudinal axis 104 forward and aft to which an airfoil is coupled. Airfoils are generally designed to maximize aerodynamic performance at a particular Mach number or range of Mach numbers. In various circumstances and conditions, operation at off-design Mach numbers is desirable. The airfoil includes aircraft wings 102. However, the airfoil may also include other aerodynamic shapes including the fuselage, tail, and other structures within the air stream. Wings 102 can further include winglets 103.

Figure 2A:
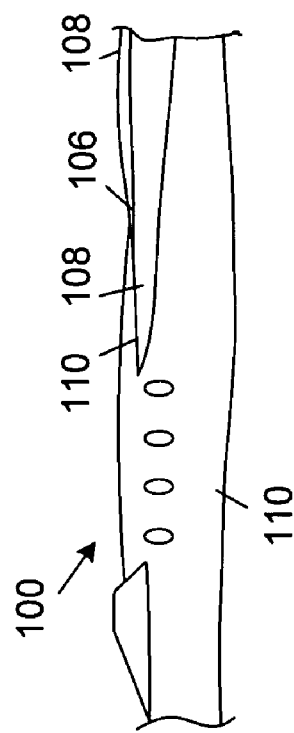
Figure 2B:
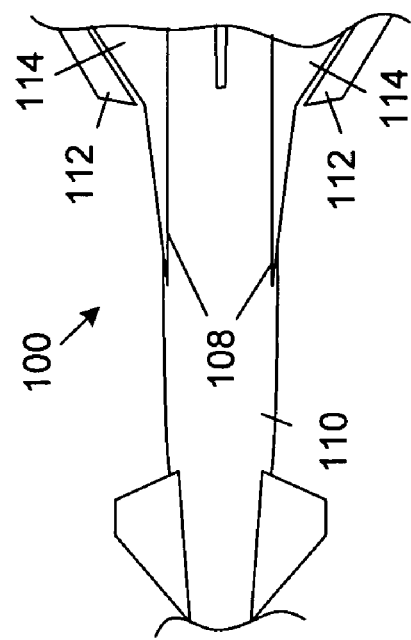
Figure 2C:
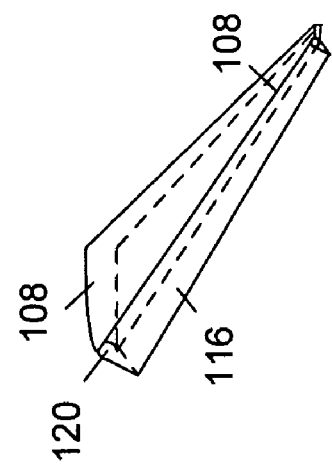

FIGS. 2A, 2B, and 2C illustrate side, top, and three-dimensional perspective views of an embodiment of portions of wings for usage on aircraft 100. Wings 102 couple to a strake 108 that couples to aircraft fuselage 110 and extends along a portion of the aircraft fuselage 110 to leading edge 112 of wings 102. Strake 108, generally a small aspect ratio lifting surface with large sweep angles, typically functions as a vortex lift generator. A leading-edge flap 116 may be coupled to the strake leading edge 118. However, this leading edge flap is not necessary in all embodiments. If present, strake leading-edge flap 116 can extend over a portion of the length of strake 108 or can extend the full span of strake 108. As shown in FIG. 2C, strake leading-edge flap 116 is a simple or plain flap. In the simple flap, a portion of the leading edge 118 can have a hinged pivot 120 or can be driven by a wheel on rail type of mechanism as in commercial jets. The pivot or other moveable structure enables a surface of strake leading-edge flap 116 to move or extend downward. Leading-edge flap 116 can be controlled to improve aerodynamic flow fields for flight at Mach numbers different from the Mach number to which the aircraft design is optimized. Operation of the strake leading edge flap improves aerodynamic performance at off-design conditions. Strake leading-edge flap 116 can also reduce lift ahead of spillage at an off-design condition and help maintain a low sonic boom signature.

In the embodiment depicted, strake 108 typically functions as a leading edge flap device configured to function as a subsonic leading edge even at supersonic conditions and a vortex lift generator positioned in front of the leading edge of wing 102. Wing 102 typically has a smaller sweep angle and a larger aspect ratio than strake 108. Strake 108 creates spiral vortices by separating flow at its leading edge 118. Flow reattaches on the wings' upper side, producing a nonlinear lift due to depression on strake 108 and on portions of wing 102.

Strake 108 or a portion thereof functions as a leading edge device that in some embodiments can be controlled to improve aircraft performance and utility. For example, strake leading-edge flap 116 can be controlled to adjust the airflow fields around wing 102 and airfoil at different air speeds. For a wing 102 designed to optimize aerodynamic performance at a particular Mach number or range of Mach numbers, for example 1.6 to 1.8, the leading-edge flap 116 can adjust aerodynamic flow fields to the actual Mach number during flight. In a specific example, if a wing is designed for optimal aerodynamic performance at Mach 1.6 and airspeed of Mach 1.8 is desired, strake leading-edge flap 116 can be adjusted to produce flow fields to optimize the airfoil for Mach 1.8 conditions. Flow fields are most affected by airfoil shape and form at the leading edge, which sets the form of the downwash on wing 102. Accordingly, strake leading-edge flap 116 optimizes airfoil effective shape to adjust the optimum Mach number of the aircraft. Additionally, the strake can be deflected up or down to control the aircraft's sonic boom signature, to manage or reduce air spillage and also to improve drag when flying at off-design Mach conditions.

Referring to FIGS. 2D and 2E, pictorial diagrams respectively show bottom and side views of an embodiment of a leading edge strake flap 116, particularly showing a swept hinge line 113 of the strake flap 116. The swept hinge line 113 enables strake flap rotation without unsealing the flap 108 from the fuselage 110. FIG. 1E depicts an example of the range of motion 119 of an embodiment the leading edge strake flap 116.

Figure 3A:
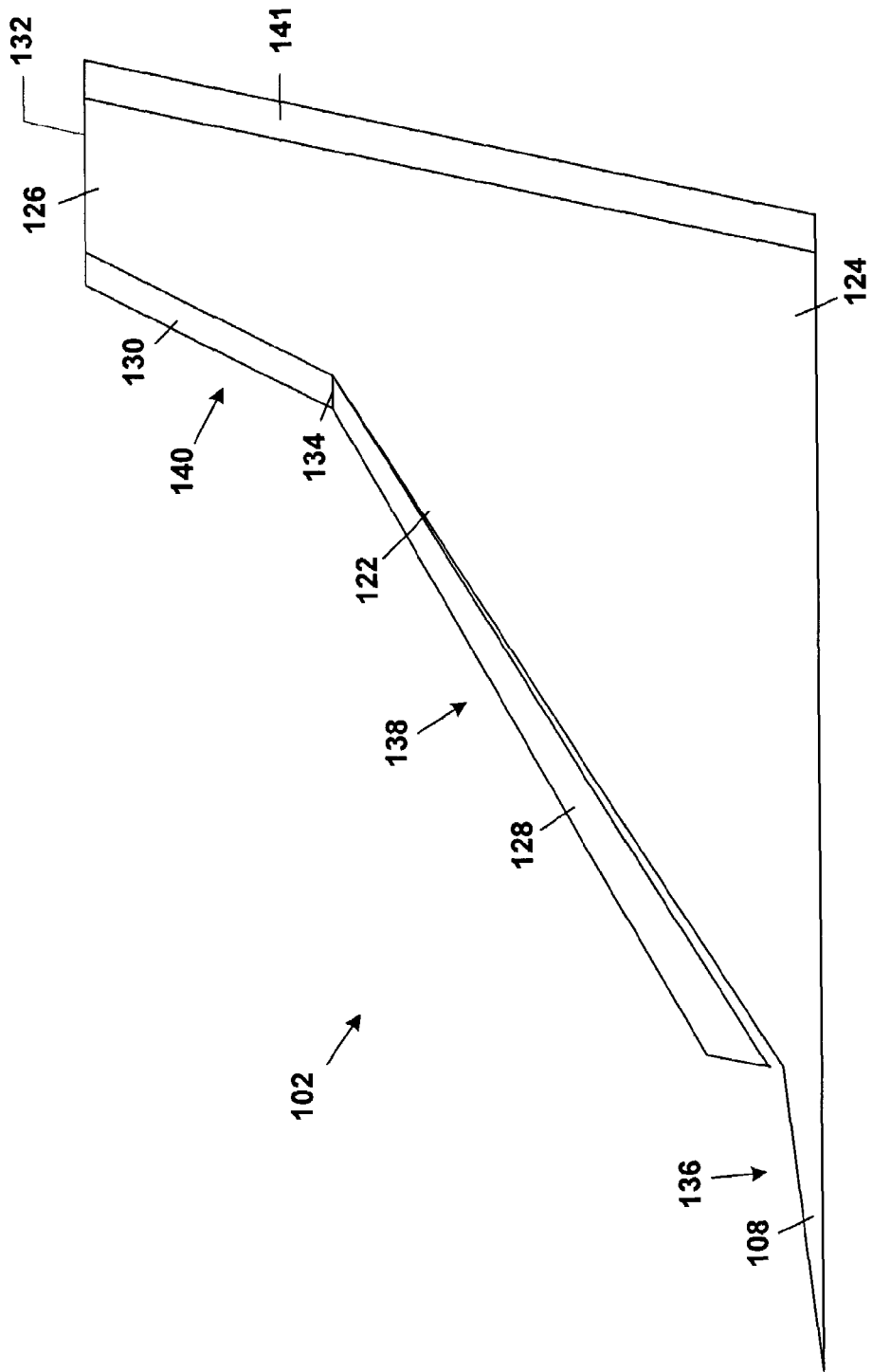

Referring to FIGS. 2F and 2G, schematic pictorial diagrams show top views of an embodiment of the leading edge strake flap 116 to illustrate aerodynamic influence of the flap 116 in operation. As Mach number is reduced, as shown in FIG. 2G in comparison to FIG. 2F, the leading edge flap's influence moves ahead of the wing, shown by movement 121. Therefore, the optimal deflection of the leading edge strake flap 116 tends to change when Mach number changes. In addition, sonic boom lift distribution constraints tend to benefit from deflection of the leading edge strake flap 116. From another perspective, flight not constrained for sonic boom has a reduced drag penalty when the strake leading edge strake flap 116 is deflectable. The outboard section can trap all the upwash generated by the inboard wing, behind the Mach cone angle but ahead of the inboard wing leading edge. This makes the outboard wing a more efficient place to generate lift than otherwise possible. Integrating this outboard with sonic boom minimization, by keeping the equivalent area less than or equal to the George-Seebass-Darden ideal equivalent area definition, allows the aft load needed for minimization to be met with less induced drag. FIGS. 3A and 3B further teach such wingtips.

FIG. 3A depicts an embodiment of wing 102 in further detail. Aircraft wing 102 mounts onto aircraft fuselage 110 (FIG. 2A). Leading edge 122 extends along the wing inboard 124 to outboard 126. Strake 108 couples to aircraft fuselage 110 and extends from the fuselage to leading edge 122. As shown, leading edge 122 comprises a Krueger flap 128 outboard of strake 108 and inboard of a simple flap 130. Krueger flap 128 and simple flap 130 generally have different leading edge structures. The Krueger flap may extend over a range of leading edge 122 and functions to reduce vortex drag at supersonic cruise speeds, increase aft lift, and reduce trim drag while providing a reduced sonic boom signature. Generally, leading edge flaps bend or extend a surface downward along a forward portion of the wing. The entire leading edge may be a single structure or may have multiple leading edge segments with leading edge flaps of various types. For example, in some embodiments, Krueger flap 128 can extend from strake 108 to the wing tip. Krueger flap 128 can couple to leading edge 122 at a relatively inboard portion of the wing adjacent strake 108. Simple leading edge flap 130 can couple to leading edge 122 of wing 102 and extend from junction 134 with Krueger flap 128 to outboard winglet 132. Strake leading-edge flap 116 operates as a leading-edge device that, for subsonic performance, deflects to create an airflow field impinging on Krueger flap 128 so that the upper surface airflow field reduces or eliminates inboard vortices.

Wing 102 and strake 108 are both arranged at a sweep angle from the fuselage and form a swept wing that extends at a sweep angle from the fuselage. As depicted, wing 102 and strake 108 are configured with different sweep angles to form a swept wing that extends in a plurality of sweep angles from the fuselage on inboard segment 136, central segment 138, and outboard segment 140. For example, the sweep angle of wing 102 differs from the sweep angle of strake 108. Furthermore, the sweep angle of central segment 138 inboard of junction 134 can differ from the sweep angle of outboard segment 140. In other embodiments, the sweep angles may be the same for wing 102 and strake 108. Outboard segment 140 may be swept to partially trap the upwash generated by inboard segment 136 and central segment 138.

Referring to FIGS. 3B and 3C, schematic pictorial diagrams show top pictorial views of an embodiment of an aircraft lift device with a Krueger flap 128 in respective non-deployed and deployed positions. As shown in FIG. 3B, with the Krueger flap 128 in the retracted position, the leading edge 122 transitions inboard to outboard along the retracted Krueger flap 128 to the junction with the leading edge plain flap 130. The intersection between the retracted Krueger flap 128 and the leading edge plain flap 130 forms a sharp leading edge angle (or discontinuous increase in chord), termed a dog-toothed arrangement 131. As shown in FIG. 3C, the deployed Krueger flap 128 meets and seals with the deflected outboard leading edge plain flap.

Figure 4:
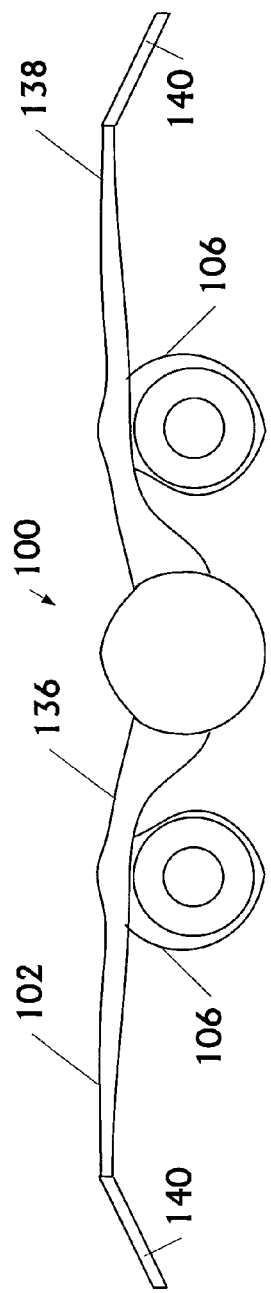
FIG. 4 provides a head on view of an embodiment of an aircraft employing some of the teachings of the disclosure.

Not only may the sweep angle of the segments differ, the dihedral angle of these segments may differ as well. For example, the dihedral angle of outboard segment 140 may be negative or anhedral. As previously discussed an anhedral of about 30° provides improved roll control. An anhedral of about 90° provides improved directional control. In either case, the ground effect may be enhanced to provide improved take-off performance. In this instance, wing 102 takes on a gull like profile with outboard winglet 140 inclined downward from the lateral axis of the aircraft, as depicted in FIG. 4. As shown, at least a portion of inboard segment 136 has a positive dihedral angle relative to the aircraft's lateral axis. Central segment 138 is approximately parallel to the aircraft's lateral axis. Outboard segment 140 comprises a winglet that is anhedrally oriented relative to the aircraft. Anhedral outboard segment 140 increases directional stability and control, increase the ground effect during takeoff, and provides positive wave interference with the nacelles 106.

Modifying wing tip flow with outboard winglets alters the trailing tip vortex produced by an aircraft wing and enhances the aircraft's overall performance. Winglets take advantage of the strong sidewash that occurs at the wing tip. This sidewash meets the winglet at an angle of attack and produces a side force. From this the winglet forms its own horseshoe vortex system. The winglet vortex system partly cancels the wing tip vortex at the wing-tip/winglet junction and therefore the main tip vortex now forms at the tip of the winglet. By moving at the tip vortex out of the plane of the main wing with the anhedral orientation of the winglet relative to the aircraft's lateral axis, the downwash over the wing's surface can be substantially reduced. This has the advantage of reducing the induced drag. In addition, the side force produced on a winglet, when resolved, provides a forward thrust component or negative drag. These two effects more than offset the parasitic drag produced at the winglet junctions and thus provide a beneficial effect on the overall drag of the aircraft. In addition to providing aerodynamic efficiency and both roll and directional stability and control, the control surfaces on the winglet in the form of leading and/or trailing edge devices allow the position of the aerodynamic center of the aircraft to be actively controlled during supersonic flight with minimal control surface deflections. This further aids in minimizing trim drag.

In operation, leading edge flaps, including Krueger flaps and simple edge flaps, extend for low speed operations during takeoff, approach, and landing. In a particular example, leading edge flaps can be extended up to and beyond 130 degrees to improve lift-to-drag ratio in a range around 1.5 to 2.5, resulting in better climb performance, and reduced takeoff and landing field length. Additionally, leading edge flap devices on the outboard winglet can provide a measure of roll control at supersonic speeds and directional control with proverse roll effects.

Referring to FIGS. 3A-3C, and 4, FIG. 4 depicts a front profile of aircraft 100 with anhedral outboard segment 140. The inboard portion of the wing may comprise about 85% of the wing span and does not require a negative dihedral. Leading edge 122 has incorporated thereon leading edge flap devices which are controlled to reduce the vortex and trim drag of the wing at supersonic cruise and increase at lift for the boom while providing a low boom signature. The anhedral orientation of the winglet increases directional stability and increases the ground effect during take-off as well as providing positive wave drag interference with nacelles 106.

Leading edge devices may be used in conjunction with trailing edge devices to reduce drag at subsonic cruise conditions. The use of the leading edge flap in conjunction with a trailing edge may reduce drag. In addition, the leading edge flaps on winglet 132 may be used for roll or directional control. The anhedral angle of winglet 140 depends on the specific configuration as there is an optimal combination of wave drag reduction at supersonic cruise and increased lift at take off, as well as directional stability. These three factors influence how much anhedral or downward inclination of the winglet there is in relation to the aircraft's lateral axes. This relation may be predicted or empirically determined based on the desired combination of properties to be exhibited by the supersonic winglet.

Figure 5:
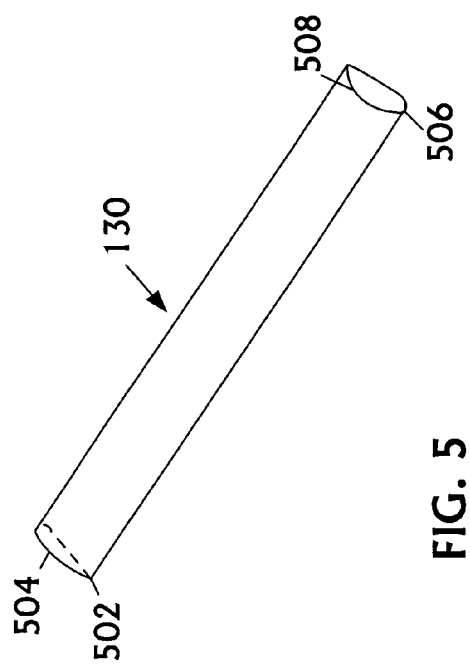
FIG. 5 is a schematic pictorial diagram that illustrates an example of a leading edge flap for usage in the aircraft lift device shown in FIG. 3.

FIG. 5 illustrates one embodiment of simple leading edge flap 130. As shown, leading edge flap 130 is a simple leading edge flap having a cross-sectional form transitioning from a sharp or pointed form 502 at the outboard end 504 to a rounded form 506 at Krueger flap junction 508. The variable form of leading edge flap 130 from the outboard sharp point transitioning to a more rounded form in the inboard direction to a junction with the Krueger flap reduces or minimizes sharp edges or gaps in the wing leading edge. Some aircraft embodiments may omit the simple flap in favor of a Krueger flap(s), or other suitable device, that extends to the wing tip.

Leading edge flap 130 at the outboard end 504 can have varying degrees of sharpness or pointed character. In general, leading edge flap 130 transitions from an edge with a relatively small radius of curvature at the outboard end 504 to an edge with a relatively larger radius of curvature at the inboard end of the Krueger flap junction 508.

Although leading edge flap 130 is depicted as a simple leading edge flap, combinations of other types of flaps can be used. For example, some arrangements can use a split flap in the span wise direction, in which a hinged portion of the bottom surface of the wing can be extended to increase the angle of attack by changing the chord line. In other configurations, a Fowler flap can be used that, when extended, tilts downward and also slides rearward. In other systems, a slotted flap may be used that, in addition to changing the wing camber and chord line, to allow some high-pressure air beneath the wing to travel through the slot. Other embodiments can use any other suitable type of flap. Furthermore, some embodiments, for example configurations in which the leading edge is subsonic, may omit usage of the leading edge flap.

Figure 6A:
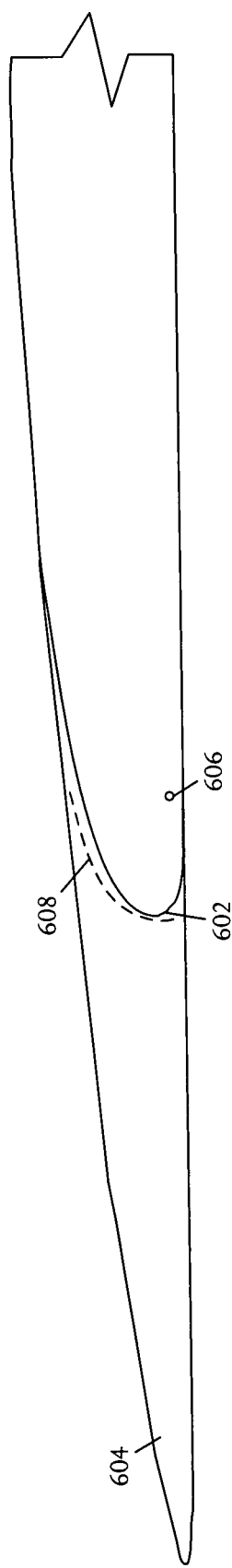
FIGS. 6A and 6B are schematic pictorial diagrams showing embodiments of different airfoil planforms.
Figure 6B:
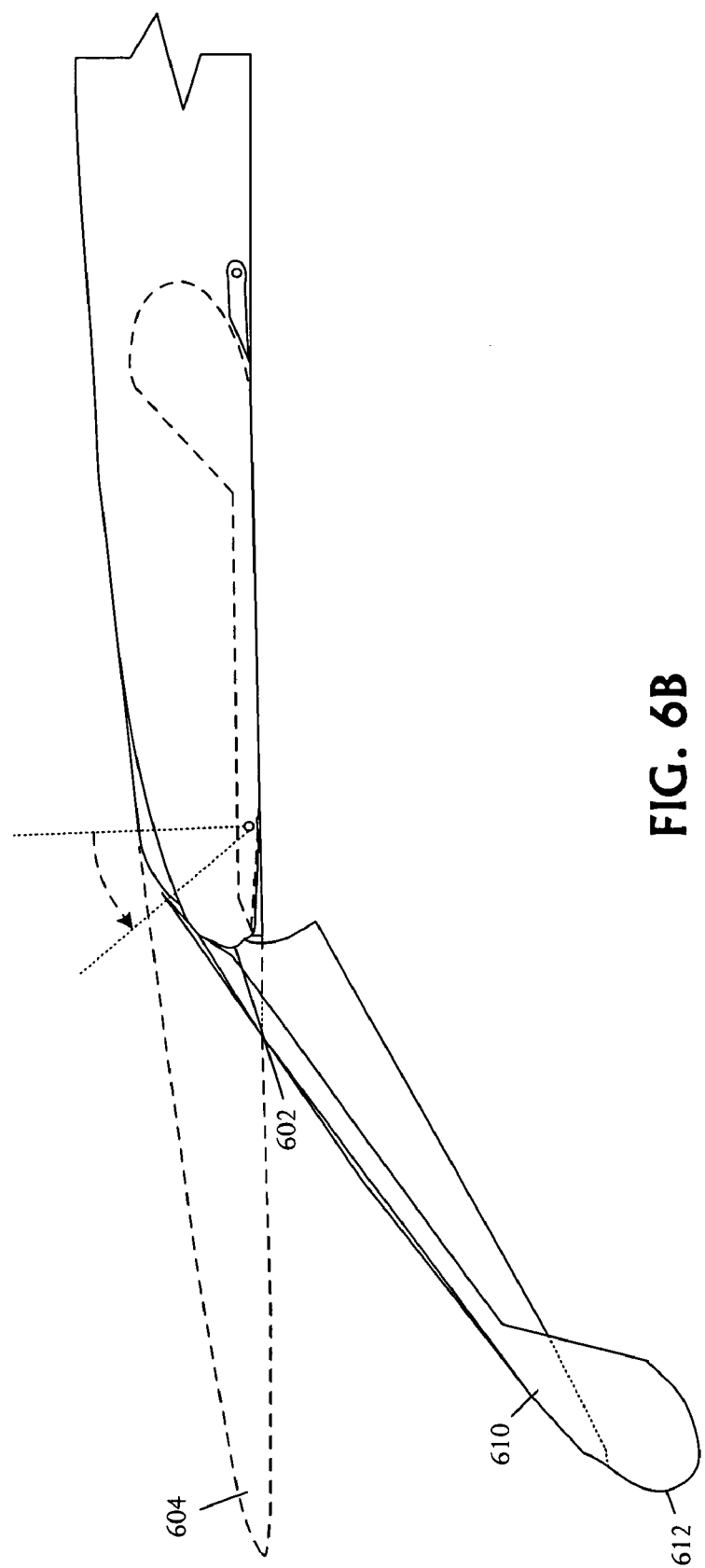

FIGS. 6A and 6B provide cross-sectional partial airfoil views showing the transition from the inboard to outboard leading edge. FIG. 6A illustrates the transition from a round inboard leading edge 602 to the outboard dog-toothed, sharp leading edge 604. As shown, sharp leading edge 604 can have a hinge line aligned with center section round leading edge 602. The sharp plain leading edge flap 604 pivots about a pivot point 606 along a hinge line 608. Also shown is a portion of the wing under the flap surface. This arrangement allows deflections of the flaps to occur without creating steps or discontinuities in the wing's leading edge.

FIG. 6B shows the transition from the round Krueger flap 610 to the dog-toothed, sharp plain leading edge flap 604. Krueger flap 610 has a round leading edge radius 612 that gradually blends to a sharp edge moving inboard to outboard along the leading edge 602. The gradual tapering from rounded to sharp of the Krueger flap leading edge encourages attached flow and thereby lowers drag.

Figure 7A:
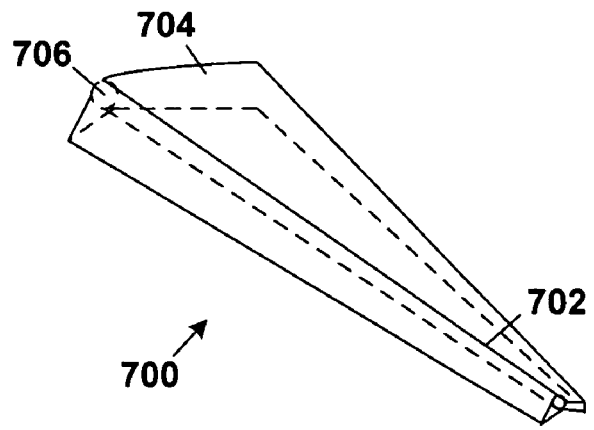
FIGS. 7A-7C depict embodiments of different airfoil planforms.
Figure 7B:
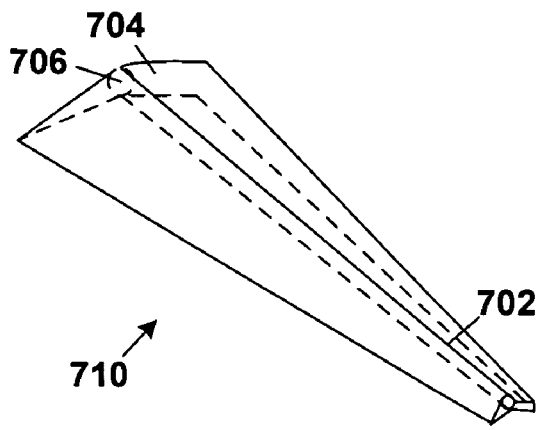
Figure 7C:
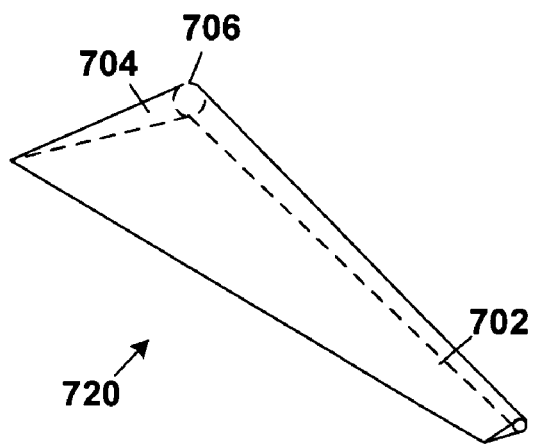

Referring to FIGS. 7A, 7B, and 7C, schematic pictorial diagrams show various planform embodiments of aircraft lift devices 700, 710, and 720, respectively. In various embodiments, an aircraft lift device comprises a simple leading-edge flap 702 mounted to a strake 704 of a highly swept leading edge supersonic planform. The supersonic planform includes a wing and a body, also called a fuselage. Leading-edge flap 702 may include the entire strake 704 and sweeps about a body junction. The hinge line or pivot 706 may vary from a direction that is orthogonal to the fuselage to a configuration that is parallel to the strake leading-edge.

The leading-edge devices 700, 710, 720 can be used to soften the sonic-boom signature for a given supersonic configuration and/or improve aerodynamic performance, in other words lower drag, at off design conditions such as lower or higher cruise Mach numbers. If a Krueger flap is used as a leading-edge device for subsonic performance the leading-edge strake device, when deflected, facilitates formation of a favorable flow field for the Krueger flap so that the upper surface flow field is substantially free from inboard vortices. A smooth transition of simple leading-edge flap device to a Krueger flap similarly assists in avoidance of inboard vortices.

Figure 8A:
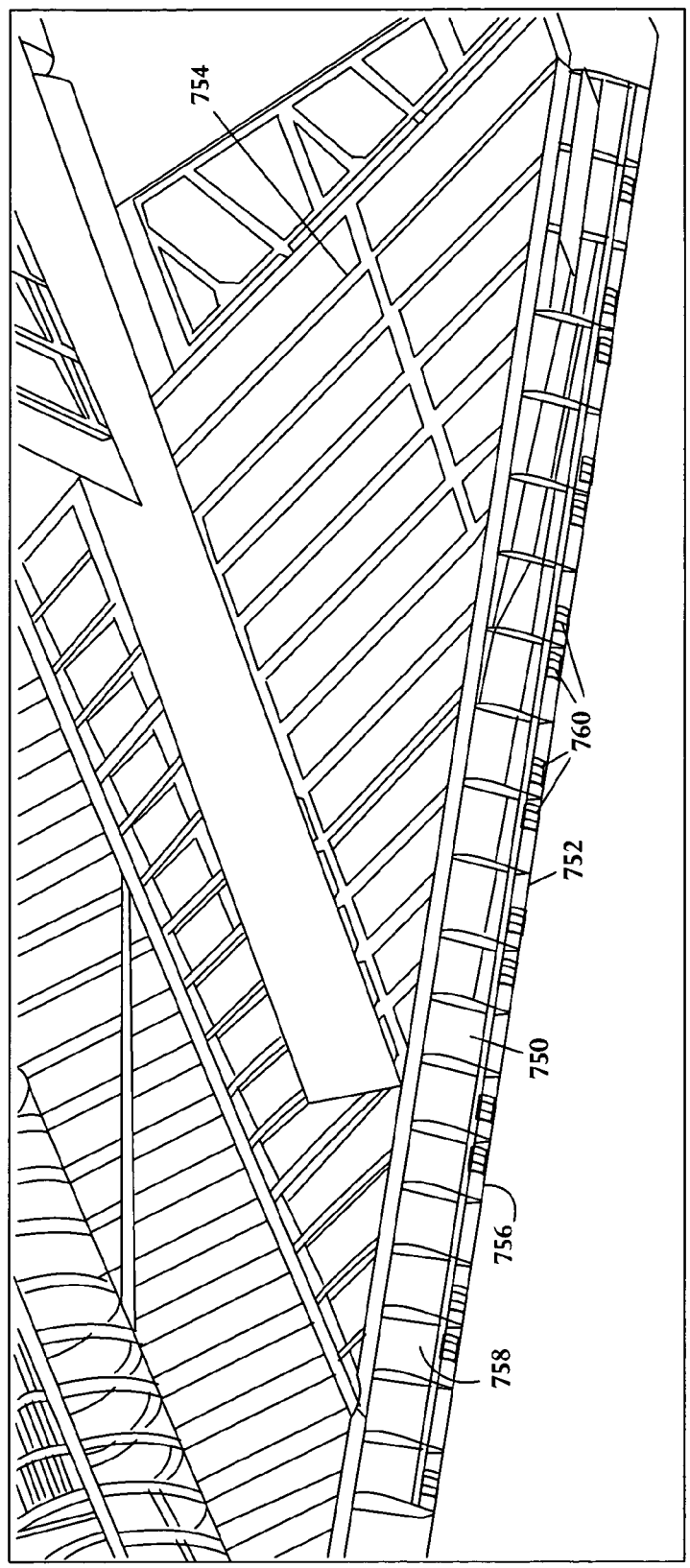
FIGS. 8A-8D depict pictorial and cross sectional views of an embodiment of a Krueger flap arrangement.
Figure 8B:
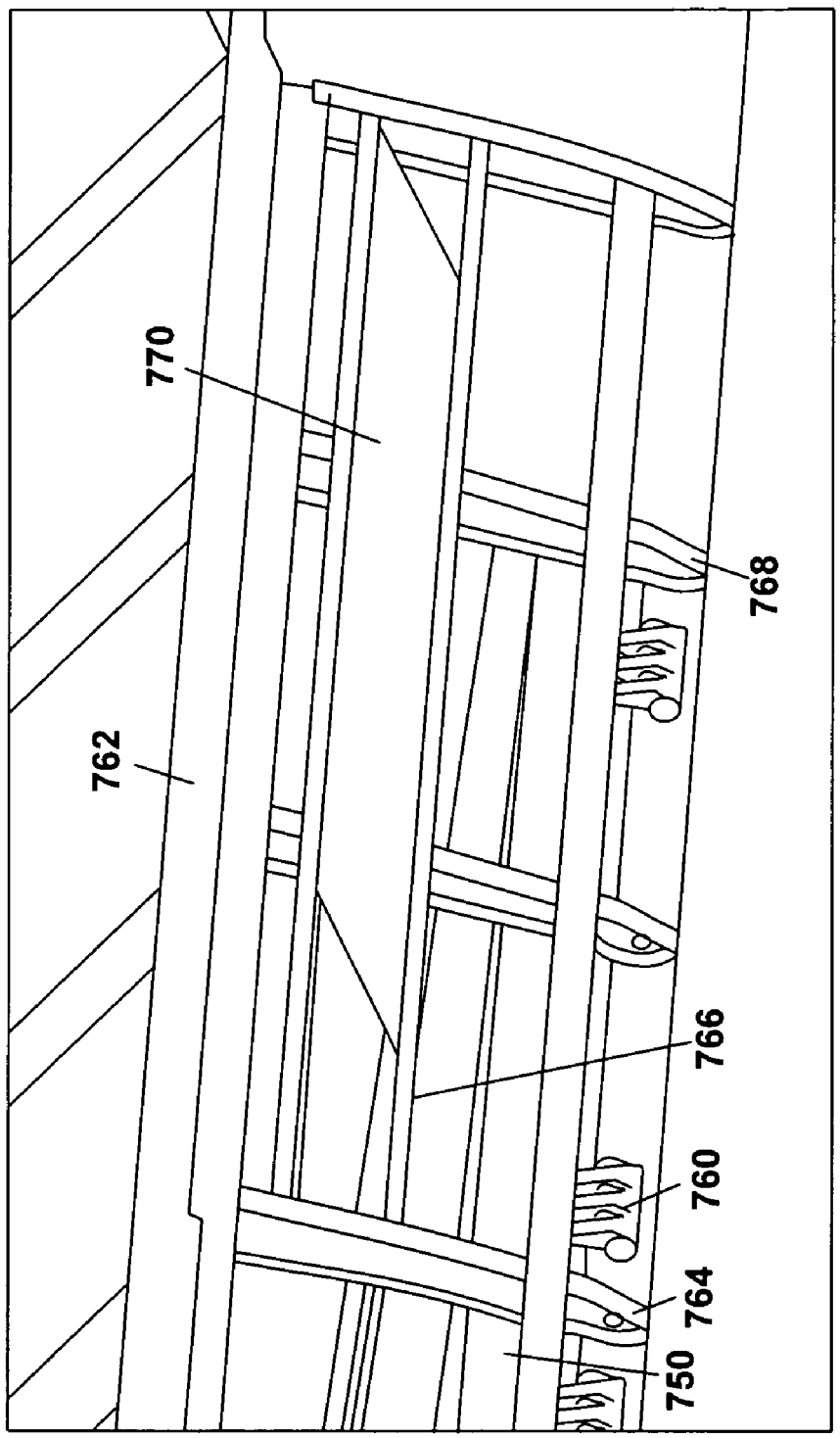

FIGS. 8A and 8B provide schematic diagrams showing one embodiment of a Krueger flap 750. Krueger flaps 750 are aerodynamically-effective movable components on the leading edge of the airfoil. These high-lift devices supply additional lift in certain configurations and under certain flight attitudes. Krueger flaps 750 are connected to the leading edge 752 of the wing 754 and extend from lower surface 756 to increase lift capability during low-speed operation. High-lift devices, such as Krueger flaps 750, facilitate lift-off and landing at low speeds, and maintain undisturbed wing root airflow over the wing upper surface 758 without separation at the transition from fuselage to wing.

In one embodiment, leading edge Krueger flaps 750 include two surfaces, inboard and outboard, which rotate out 145°. The surfaces are driven by rotary actuators 760, with multiple slices connected to each panel. The slices are interconnected with torque tubes, and the entire assembly is driven by a central power drive unit (PDU). The PDU may be located in the wing root area. A position sensor and an asymmetry brake can be located on the outboard end of the rotary actuator assembly.

From the stowed position, rotary actuators 760 may rotate Kruger flap 750 downward and forward from the lower surface 756 of the wing 754. As shown, Krueger flap 750 depicts one example of a rotary actuator 760 suitable for usage on a wing or other airfoil. In general, any Krueger flap with appropriate aerodynamic configuration and actuating mechanism can be used. Generally, a suitable Krueger flap has an actuating mechanism capable of forming the wing leading edge configuration into a rigid airfoil structure at multiple different operating positions maintaining short and efficient load paths. Furthermore, a suitable Krueger flap has a control linkage mechanism that is stable at the different operating positions and deflects downward when actuated through a range of selected rotational angles while maintaining a substantially smooth wing surface with an aerodynamic, relatively constant radius of curvature. The actuating linkage operates to controllably stow and deploy the flap 750 during takeoff and landing, and for usage as a speed brake, if desired, during either high or low-speed in-flight operating conditions.

FIG. 8B shows a close-up view of a portion of the Krueger flap 750 in greater detail. Details shown include a left wing front spar 762, left Krueger flap hinge point 764, a flight spoiler hinge beam 766, left leading edge rib 768, and left outboard flight spoiler 770.

Figure 8C:
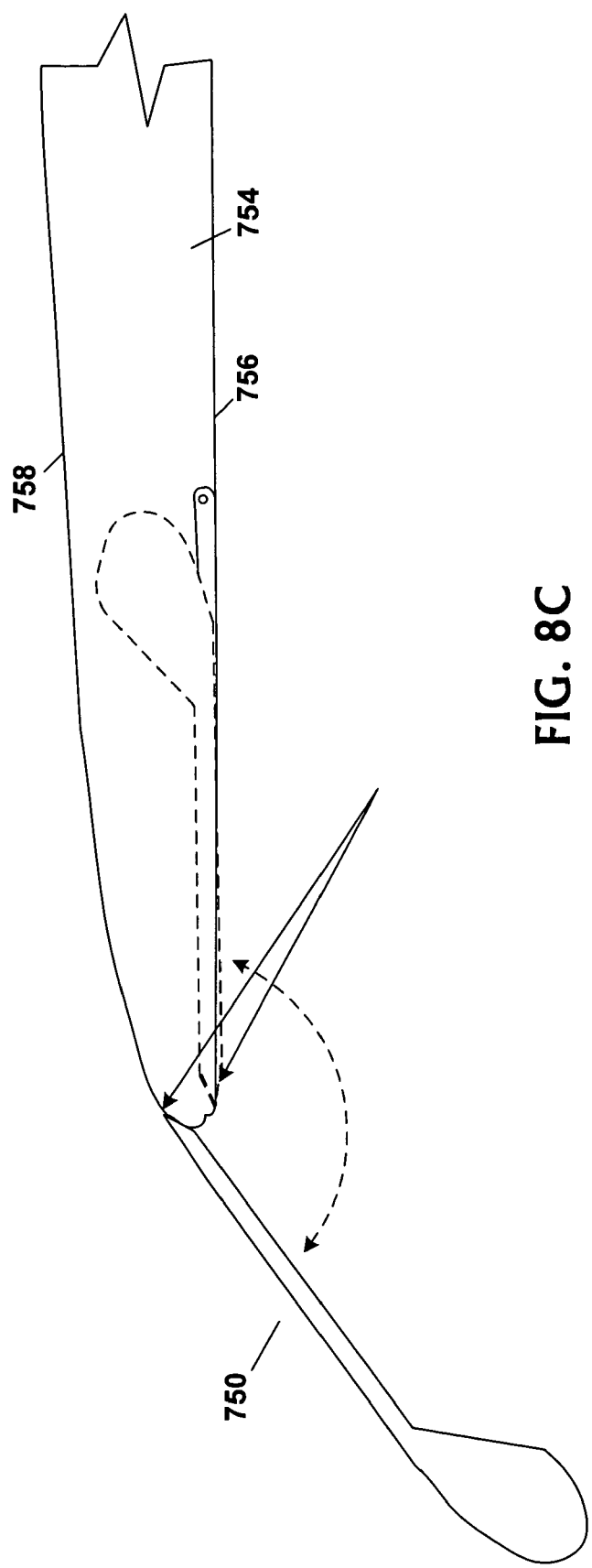
Figure 8D:
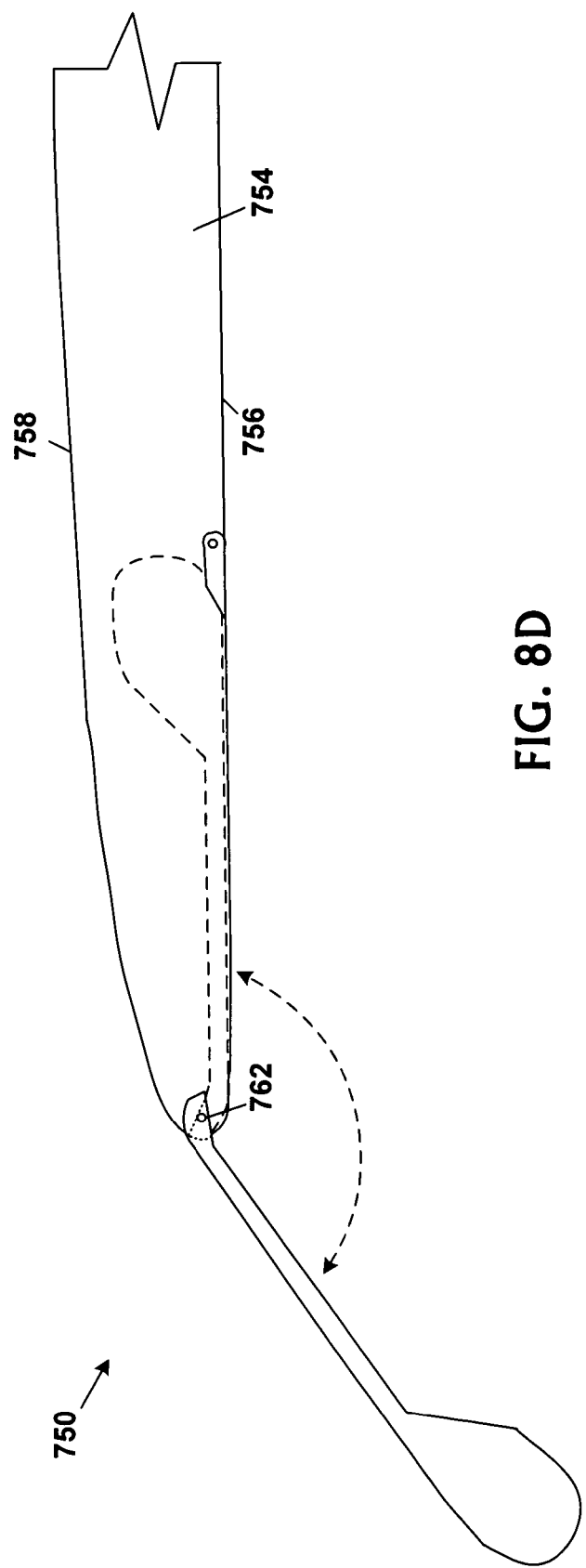

Referring to FIGS. 8C and 8D, pictorial cross-sectional partial airfoil views show two embodiments of Krueger flap arrangements. FIG. 8C shows an embodiment of the Krueger flap 750 in which the location of the Krueger flap 750 on the wing lower surface is chosen so that the curvature of the upper wing surface 758 matches the Krueger flap curvature for a desired deflection. The matched curvature increases or maximizes the radius at the transition from flap 750 to wing 754, maintaining flow attachment to wing 754 to result in lower drag. Krueger flap 750 attaches to wing 754 below the stagnation point and thereby does not disturb laminar flow on upper surface 758.

FIG. 8D shows a simplified alternative embodiment of a Krueger flap 750 having a single pivot point 762, in comparison to the flap shown in FIG. 8C.

Referring to FIGS. 8A through 8D in combination with FIG. 5, in some embodiments, the rounded form 508 of the inboard portion of the leading edge flap 130 can be configured to smoothly transition to the form of the Kruger flap at the Krueger flap junction to reduce or minimize any gap in the wing leading edge.

Returning to FIG. 3A, leading edge 122 of wing 102 can be configured so that the shape of the leading edge flap 130 merges into the form of Krueger flap 128. In particular, the structure and configuration of the leading edge flap 130 and Krueger flap 128 can be configured so that when Krueger flap 128 is deployed, airflow separation over wing 102 is reduced or minimized. The cross-sectional morphology of the leading edge flap 130 can match Krueger flap 128 to avoid structural discontinuities, protrusions, or gaps that can create a vortex at a position along leading edge 122, such as at the junction 134. Vortices formed at the top of wing 102 corrupt the flow field. Leading edge flap 130 avoids flow field corruption via usage of rounded edges and structures in Krueger flap 128 and the leading edge flap 130, particularly in the vicinity of the junction 134.

In various embodiments, junction 134 between the leading edge flaps can have some structural discontinuity. A structural element that smoothes the transition between segments can be used to improve aerodynamic performance. This structural material can be a flexible material such as rubber, plastic, a synthetic, or other suitable material.

The particular structure of Krueger flap 128 and the leading edge flap 130 can vary depending on the wing configuration. For example, leading edge 122 may have either a subsonic or supersonic leading edge. When leading edge is contained within the Mach cone of the aircraft, structural discontinuities, protrusions, and gaps are to be avoided. However, when the leading edge is outside the Mach cone, the leading edge flap 130 can include more irregular structures such as a sharp edge transitioning to a Krueger flap structure.

Any suitable element or structure can be used to mate the leading edge flap segments when either stowed or deployed. Generally, the portions of the leading edge flaps at the junction can be formed so that the edges of each have similar shape, thereby reducing or eliminating structural discontinuity at the junction.

Figure 9A:
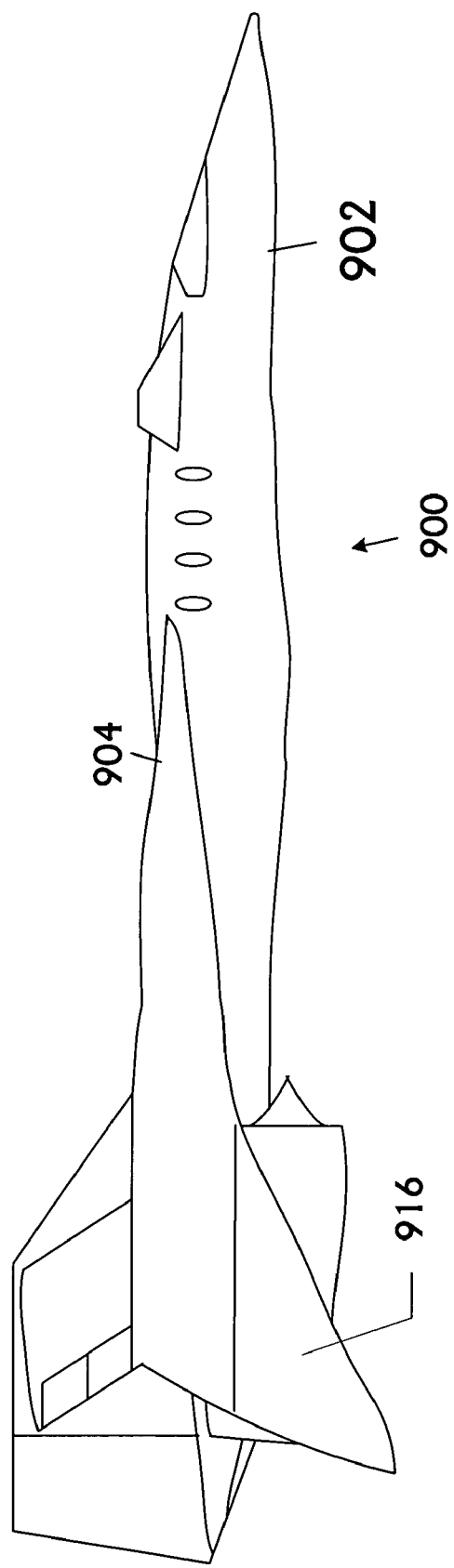
FIGS. 9A-9C are schematic pictorial diagrams respectively depicting side, front, and top views of a supersonic aircraft that can utilize the illustrative lift devices.
Figure 9B:
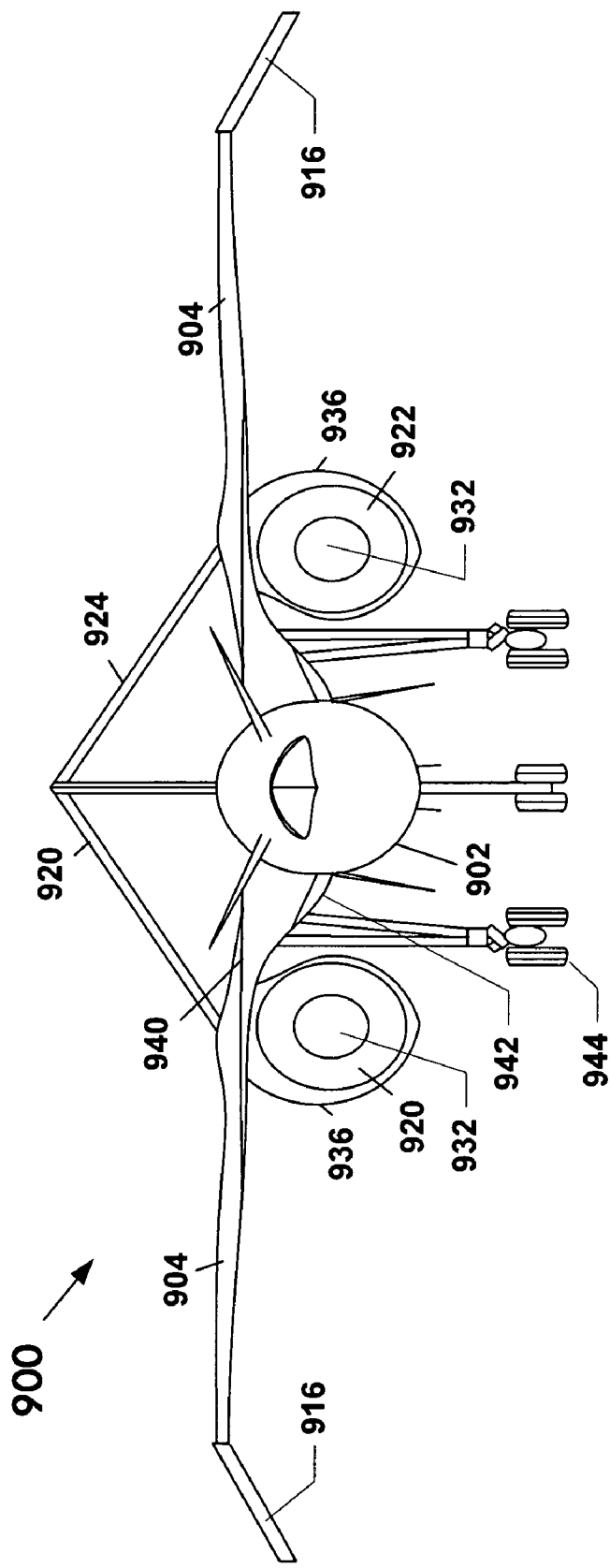
Figure 9C:
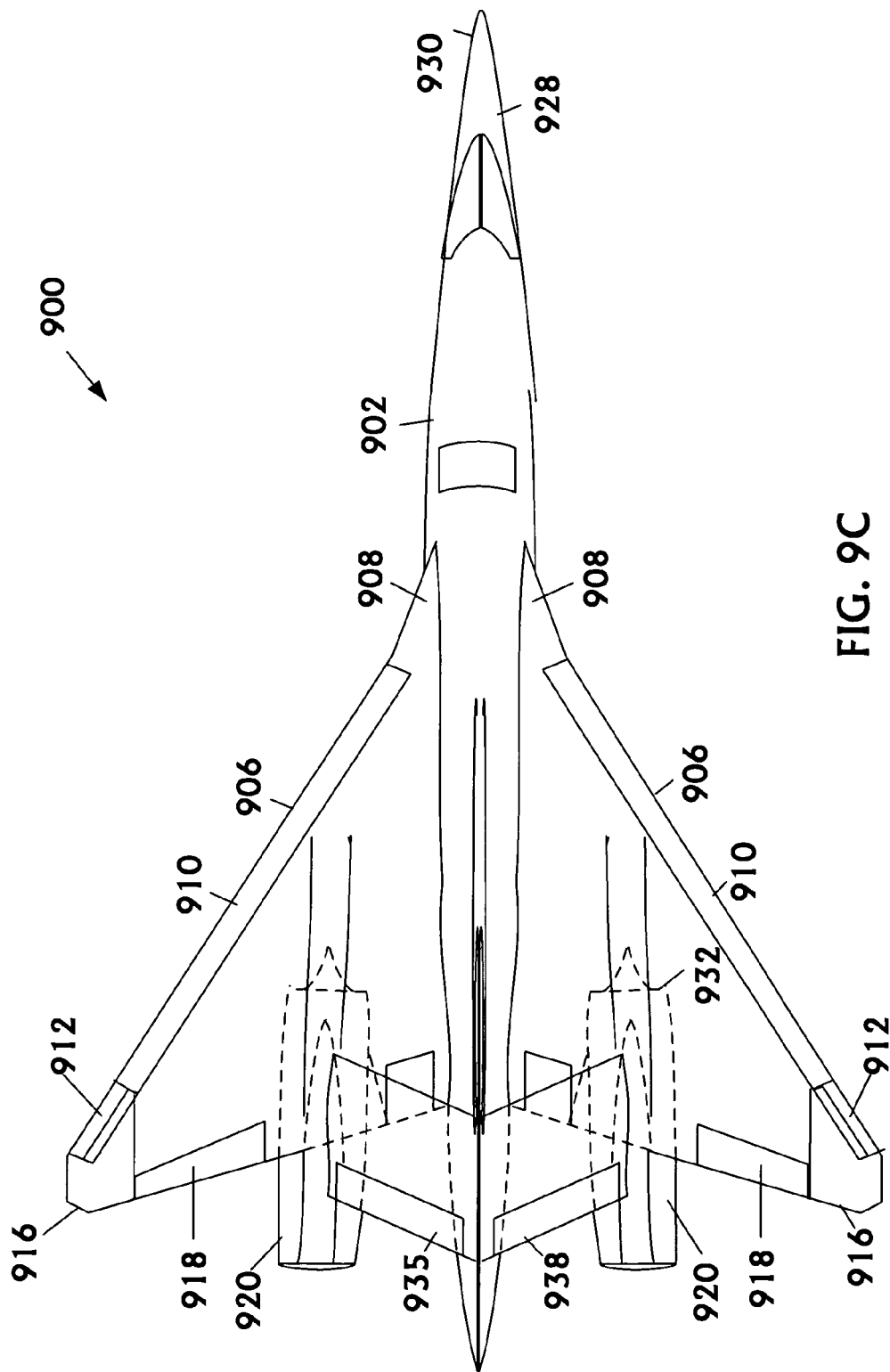

FIGS. 9A, 9B, and 9C depict side, front, and top views of an embodiment of supersonic aircraft 900 that employs an airfoil capable of improving aircraft performance by facilitating positive aerodynamic effects including adjustment of flow fields to improve aerodynamics at a range of air speeds and maintaining a low sonic boom signature. Aircraft 900 comprises a fuselage 902 and wing 904 coupled to fuselage 902. Wing 904 has a leading edge 906 that extends from an inboard edge at fuselage 902 to an outboard edge at the wing tip. The airfoil further comprises a strake 908 that couples wing 904 to fuselage 902 and extends to leading edge 906 of wing 904. Krueger flap 910 couples to leading edge 906 adjacent strake 908. Similarly, leading edge flap 912 couples to leading edge 906 and extends from junction 914 along the leading edge of winglet 916. As the Mach cone angle moves farther aft the higher the lift is carried vertically, dihedral raises the height of the wing toward the outboard section. However, too much dihedral makes the aircraft roll during sideslip. To maximize the height of the wing for sonic boom minimization without saturating roll control during sideslip, the wing can employ higher inboard dihedral and an anhedraled wing tip. As shown in FIG. 9B, winglet 916 takes advantage of its greater moment arm to counter the roll from greater inboard dihedral. By making greater inboard dihedral controllable, this anhedraled winglet improves sonic boom minimization Additionally, winglet 916 typically outboard of the fuel extent allowing the fuel bearing portion of the wing 908 to be flat or dihedraled to facilitate pumping fuel, and allow movement of winglet 916 as a control surface. The relatively small, lower sweep outboard winglet 916 does not negatively impact fuel volume or bending loads.

Aircraft 900 includes a control system that adjusts the leading edge control surfaces of the wings 904 to improve aerodynamic flow fields for flight at Mach numbers different from the Mach number to which the aircraft design is optimized, reduce vortex and trim drag, reduce the sonic boom signature of the aircraft while at supersonic cruise conditions, and provide a measure of roll or directional control. Additionally, the leading edge control surfaces may be used in conjunction with one or more trailing edge devices 918 to reduce drag at subsonic cruise conditions.

In the illustration shown, aircraft 900 has engines 920 positioned in aft locations beneath wings 904 and a highly integrated wing/inlet geometry 922 to produce low-boom compatibility and low inlet/nacelle installation drag. As shown, aircraft 900 has an inverted V-tail geometry 924 that generates low-sonic-boom longitudinal trim in cruise and structural support for the engines 920.

Aircraft 900 has an elongated nose 928 with nose tip 930 and inverted V-tail surface 924 that overlaps wing 904. These features facilitate low-sonic-boom aircraft performance. The configuration suppresses a sonic boom pressure waveform that otherwise amplify the sound of the sonic boom. Rapid pressure rises at the front and rear of the pressure wave produce the characteristic double explosion of the sonic boom. These pressure rises are ameliorated in the illustrative design by various structural and operational improvements including the wing leading edge structures and control techniques described herein.

Nose tip 930 can create a pressure spike ahead of the aircraft forward shock, raising local temperature and sound velocity, thereby extending the forward shock and slowing the pressure rise. Supersonic aircraft 900 has a sharply swept arrow wing configuration that reduces peak overpressure in the wave by spreading wing lift along the aircraft length.

Aircraft 900 has twin non-afterburning turbofan engines 920 set below and behind wing 904. The non-afterburning turbofan engines depicted operate behind simple fixed-geometry axis-symmetric external compression inlets 932. Other engines may be used in other embodiments. Considerations of community noise and takeoff, transonic, and cruise thrust specifications determine engine cycle selection and engine sizing.

The shape of supersonic aircraft 900 integrates wing 904, tail assembly 934, and engines 920 to provide a reduced sonic boom signature and improved supersonic cruise drag considerations. Empennage or tail system 934 includes stabilizers, elevators, and rudders in inverted V-tail geometry 924. Inverted V-tail geometry 924 supports nacelles 936 in highly suitable positions relative to wing 904 to suppress supersonic-booms, and trim supersonic aircraft 900 to attain an improved low-boom lift distribution. Panels of the inverted V-tail 924 support nacelles 936 and non-afterburning turbofan engines 920 and combine with support from wing 904 to handle flutter. Inverted V-tail control surfaces, termed ruddervators 938, adjust aircraft longitudinal lift distribution throughout the flight envelope to maintain a low boom, low drag trim condition.

Fuselage 902, wing 904, and empennage 934 integrate with the entire aircraft configuration in order to achieve a low-boom signature and supersonic cruise drag levels. Wing 904 and/or fuselage 902 form an airfoil having aerodynamic characteristics appropriate for low-boom supersonic and transonic flight.

In some embodiments, wings 904 include relatively straight, non-dihedral portions 940 toward the leading edges that transition to dihedral portions 942 toward the trailing edges of the inboard segment of wing 904. Dihedral portions 942 are configured to extend lifting length and reduce sonic boom effects by adjusting the twist and camber of wings 904 to produce low-boom and low induced drag. The dihedral portions 942 are configured to accommodate forward retraction of main landing gear 944 as further described in co-pending U.S. patent application Ser. No. 10/437,679 entitled "Forward Inboard Retracting Main Landing Gear", which is owned by a common assignee and incorporated by reference herein.

In some embodiments, the inboard portion of wing 904 can be configured to integrate with nacelle 936 and a diverter formed between nacelle 936 and wing 904 to follow the contour of a low-sonic-boom fuselage 902 with as close a normal intersection as possible to attain low interference drag. In some embodiments, an inboard flap hinge line is fully contained within the wing contour with the wing upper and lower surfaces held as planar as possible to facilitate seal design.

With the resulting wing configuration, the "gull" wing raises engines 920 to increase available tipback angle and reduce thrust-induced pitching moments. Gulling enhances low-boom signature by vertically staggering the wing longitudinal lift distribution and lowers the aircraft body or fuselage 902 to reduce the height of the cabin above the ground, thereby reducing entry stair length. The low fuselage 902 assists in maintaining a low aircraft center of gravity, reducing tipover angle, and promoting ground stability.

Figure 9D:
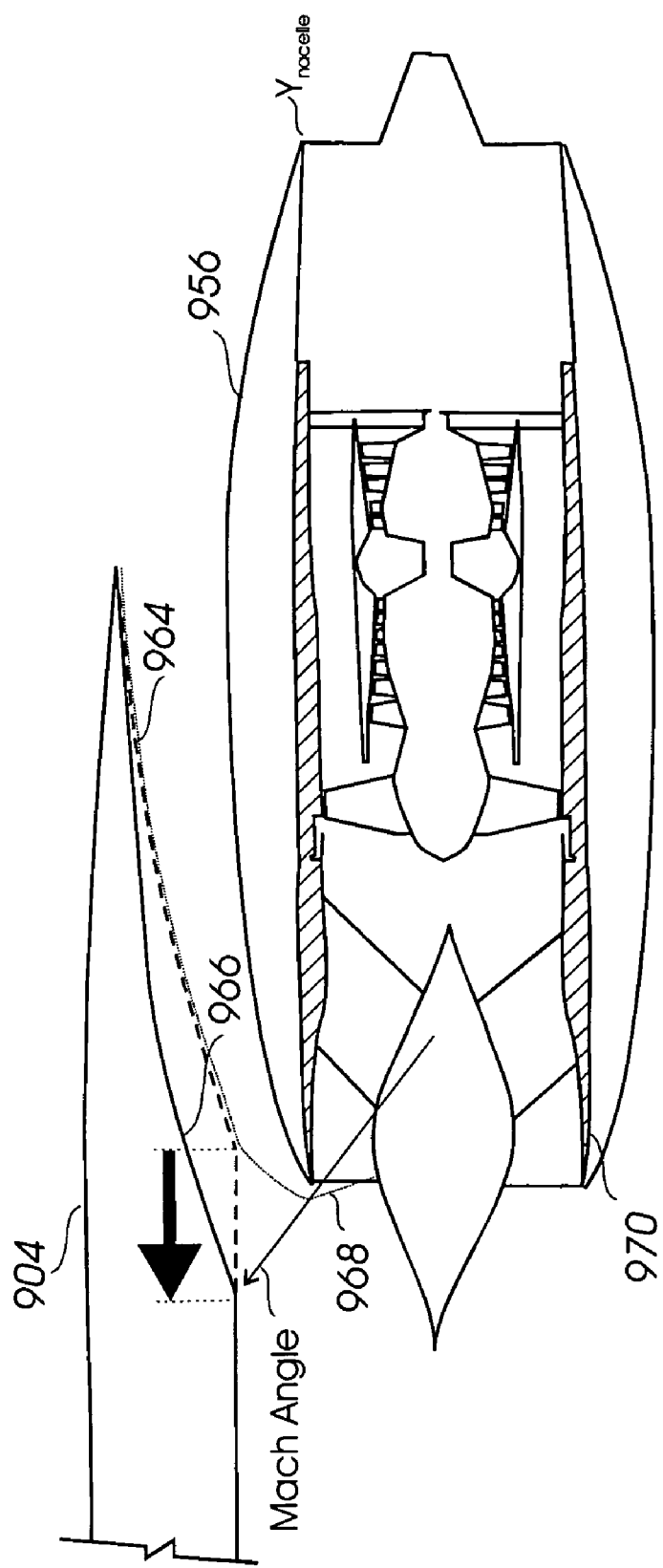
FIG. 9D shows a side view of embodiments of reflexed airfoil portions and corresponding engine nacelles configured to maintain positive pressure of the airflow to the trailing edge of a wing.

The gull wraps wing 904 around nacelle 936 and enhances a favorable interference between inlets 932 and wing 904. The anhedral of the outboard winglets increase the ground effect during take of as well as providing positive wave drag interference with the nacelles. Referring to FIG. 9D, it is desirable to carry lower pressure above wing 904 relative to below wing 904 to generate an expansion that reduces or even prevents aft shock coalescence at the trailing edge of wing 904. In such embodiments, wing 904 extends near the trailing edge of the aircraft on which it is mounted. A constraint limiting the pressure field under a reflexed airfoil portion 964, 966 of wing 904 to canceling only positive pressures can be applied during the design process. To achieve higher pressure cancellation below wing 904, the distance between the lower surface of wing 904 and nacelle 956 ideally stays substantially the same to the trailing edge of wing 904.

FIG. 9D shows a side view of embodiments of reflexed airfoil portions 964, 966 and corresponding engine nacelle 956 configured to maintain positive pressure of the airflow to the trailing edge of wing 904. Subsonic flow that can result from nacelle shock 968 and choked flow between wing 904 and nacelle 956, can spill into the inlet of nacelle 956 and disrupt the flow in engine 970. Accordingly, the reflexed airfoil portion 966 can be shifted ahead of nacelle 956 to reduce nacelle drag and choked flow between wing 904 and nacelle 956. The reflexed wing 904 is further described in co-pending U.S. patent application Ser. No. 10/713,515 entitled "Nacelle Integration With Reflexed Wing For Sonic Boom Reduction", which is owned by a common assignee and incorporated by reference herein.

The leading edge surfaces of wing 904, including the leading-edge flap of strake 908, Krueger flap 910, and flap 912 are controlled or directed by one or more control systems to adjust aerodynamic flow fields, thereby improving aerodynamic performance in operation at various airspeeds. The leading edge surfaces can also be controlled to adjust the leading-edge flow field to maintain a low sonic boom signature or to provide roll or directional control.

Figure 10D:
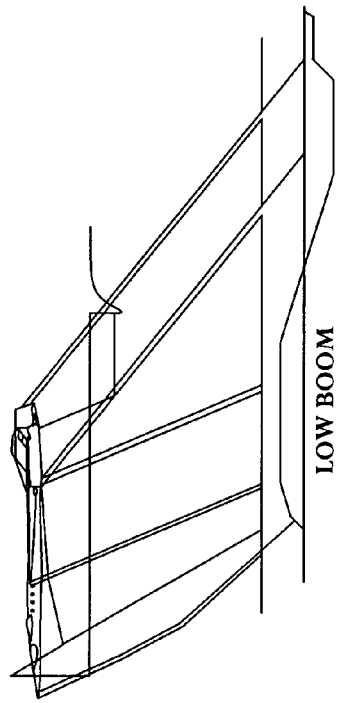
FIGS. 10A, 10B, 10C, and 10D are a series of graphs that illustrate theory upon which a low sonic boom signature is attained by controlling the leading edge flaps of the wings.
Figure 10C:
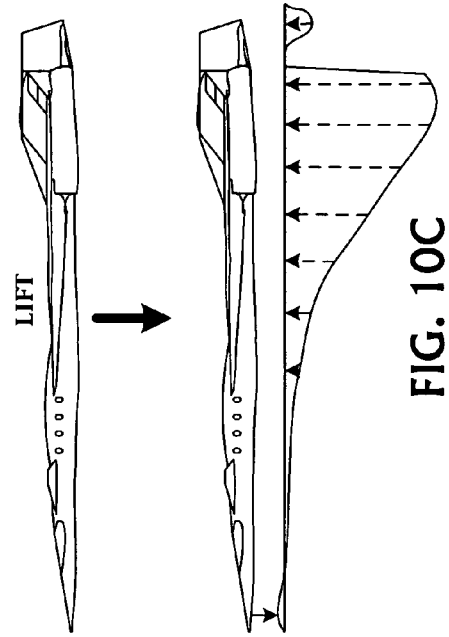
Figure 10A:
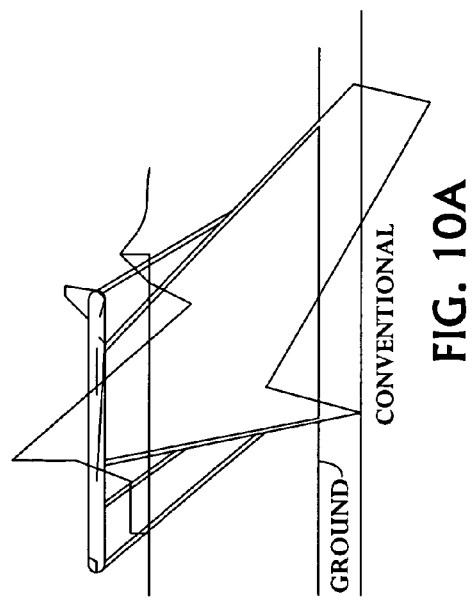
Figure 10B:
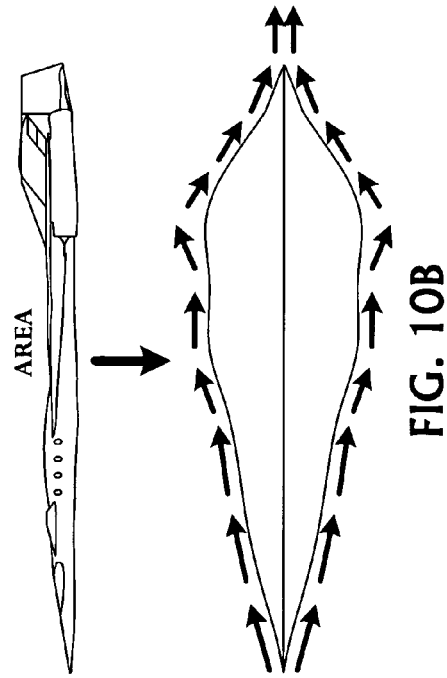

FIGS. 10A, 10B, 10C, and 10D provide a series of graphs that illustrate the theory upon which a low sonic boom signature is attained by controlling the leading edge flaps of the wings 904, reducing sonic boom loudness while maintaining long supersonic range. The leading edge control elements reduce sonic boom loudness by shaping the sonic boom for low shock strengths. FIG. 10A is a graph showing the pressure distribution from a conventional supersonic aircraft. The pressure distribution coalesces into an N-wave at the ground, a shape corresponding to the largest shock strength and thus the greatest loudness. One technique for reducing sonic boom amplitude at the ground involves a minimization theory in which a pressure distribution caused by a low boom aircraft follows an inversely calculated distribution to generate low shock strength at the ground. Contrary to intuition, a low boom distribution occurs when a strong leading edge compression quickly reduces in magnitude, followed by a gradually increasing weak compression that rapidly inverts into a weak expansion, followed by a stronger trailing edge compression that gradually recompresses to ambient. Boom minimization occurs when an aircraft produces an inversely calculated pressure distribution without sacrificing performance. The pressure distribution produced by an aircraft results from a Mach angle, cross-sectional area distribution, for example as shown in FIG. 10B, and a Mach angle lift distribution, as shown in FIG. 10C. The leading edge devices can include the strake leading edge flaps, the Krueger flaps, and the outboard leading edge flaps, individually or in various combinations, that operate to shift the lift distribution of the aircraft and shape the active area distribution to reduce sonic boom amplitude at the ground. A minimized pressure distribution, shown in FIG. 10D, occurs when the sum of the area pressure distribution and the lift pressure disturbance equal the minimized pressure distribution. The leading edge devices described herein can be used to shape the pressure distribution.

Figure 11:
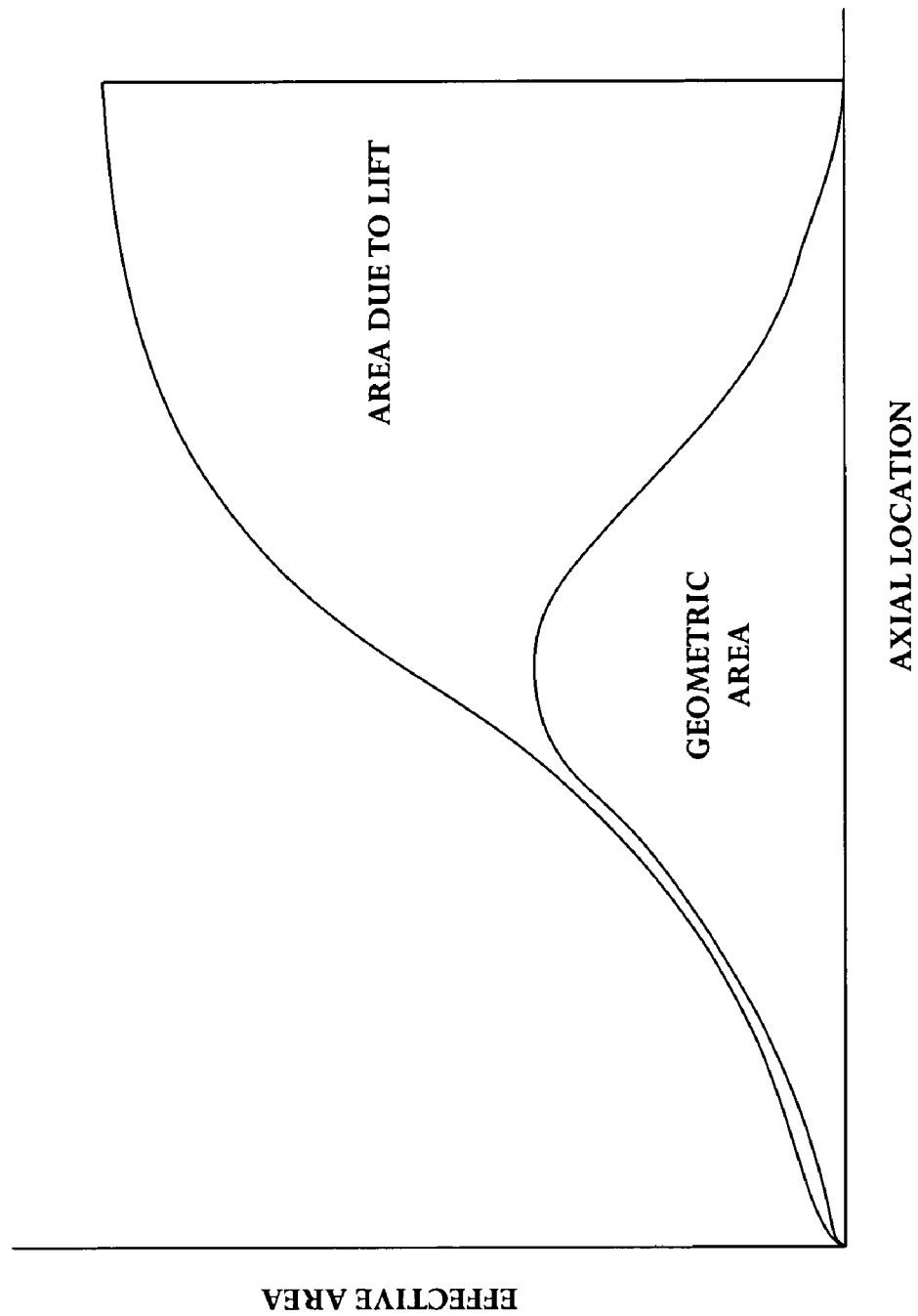
FIG. 11 is a graph that further illustrates theory of equivalent area minimization to reduce sonic boom signature, showing effective area against axial location along the longitudinal axis of the aircraft.
Figure 15:
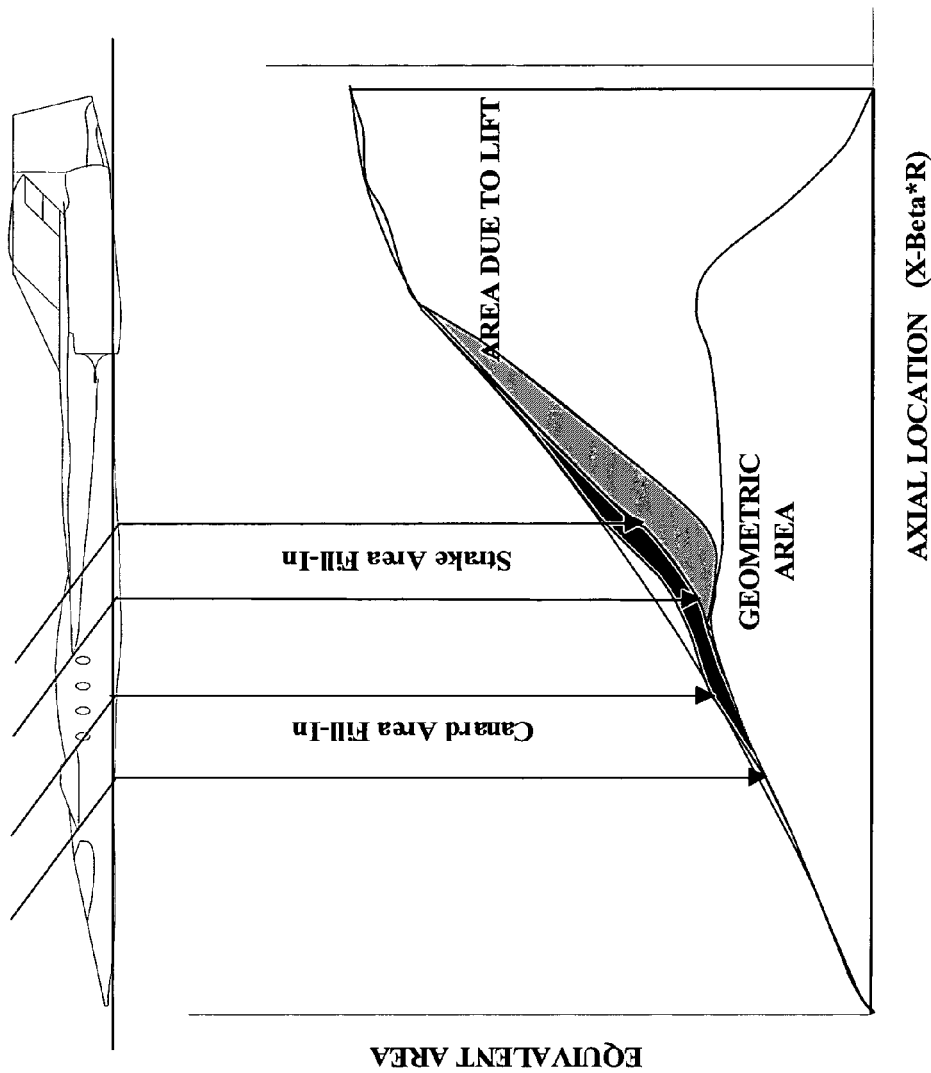
FIG. 15 illustrates the various repositionable aerodynamic surfaces.

The graph presented in FIGS. 11 and 15 further illustrates the theory of equivalent area minimization to reduce sonic boom signature, showing effective area against axial location along the longitudinal axis of the aircraft. When equivalent area due to geometric area and lift sum to the minimized distribution, a minimized ground sonic boom occurs. The leading edge surfaces are controlled to modify the airflow over wing 904, stretching the lifting length to move the active area distribution closer to the distribution that shapes the sonic boom signature and maintains a clean flow of air over wing 904, clearing any vortices from wing 904. Accordingly, the leading edge control surfaces can be controlled to create an area distribution for sonic boom shaping to a desired target.

Returning to FIGS. 9A, 9B and 9C, aircraft 900 controls the leading edge control surfaces, including one or more of leading edge flap segments in accordance with an equivalent area technique to reduce sonic boom signature. Equivalent area is the Mach angle area distribution of an axis-symmetric body that generates the same disturbance as a given geometric area or given lift distribution. The equivalent area due to geometric area can be approximated as equal to the Mach angle area distribution. The equivalent area due to lift is equal to the integral of the Mach lift per unit of streamwise length times atmospheric constants.

In the illustrative embodiment, the leading edge control surfaces are controlled to reduce or minimize sonic boom by deflecting the airflow to reduce lift ahead of the spillage due to nacelles 936. For example, if aircraft 900 is flying in an off-design condition in which the nacelles 936 are spilling air and are thus generating stronger shocks and stronger compressions, the leading edge control surfaces and be actuated to compensate by creating an expansion of air flow that blocks the spillage.

The wings and engine are generally designed to operate at various air speeds. Engine 920 and inlet 926 characteristics are configured to coordinate engine airflow schedules and flight Mach number. In a particular embodiment, a fixed geometry inlet 926 can be utilized, for example to reduce propulsion system weight and complexity, and thereby improve efficiency and performance. In particular fixed-geometry inlet configurations, airflow is matched at all pertinent Mach numbers so that no bypass or excessive subcritical spillage occurs under nominal conditions. Airflows at off-nominal conditions can be matched using engine trim and a translating engine cowl.

In one embodiment, an inlet/engine configuration is based on a supersonic aircraft engine that attains a range of 3600 nautical miles (nmi) at Mach 1.8. The fixed compression geometry engine inlet is optimized for Mach 1.8. A maximum Mach 1.8 capable design represents performance of the Mach 1.8-designed engine cruising at Mach 1.6. The Mach 1.8— capable engine flying at Mach 1.6 increases range and engine life, and potentially improves performance on hot-temperature days.

In an alternative embodiment, an engine 920 is configured with a fixed compression geometry inlet optimized for Mach 1.6, increasing range to approximately 4250 nautical miles (nm) by increasing lift/drag ratio by a full point, and a lower engine weight enabling more fuel to burn in cruise.

Various design techniques can be used to configure an aircraft for a range capability that is greater than a baseline Mach 1.8 point design approach, yet supply a greater speed capability than a Mach 1.6 point design method. One technique is to design a Mach 1.6 inlet and engine and cruise off-design at Mach 1.8 to improve range over a Mach 1.8 design inlet, for example attaining a 150-250 nm improvement in range. A second technique involves designing the aircraft as a Mach 1.6 point design for maximum range and accepting any over-speed capability that happens to occur, resulting in a small speed increase for a fully optimized Mach 1.6 engine design that is further limited by engine life reduction as well as degradation of inlet stability and distortion. In a slight variation to the second approach, the engine can be configured as a Mach 1.6 point design with the engine and subsystem design Mach numbers tailored to any speed a Mach 1.6 inlet is capable of attaining in an over-speed condition. The range benefit is even smaller than the effect of a pure Mach 1.6 aircraft but the over-speed capability can be improved although not to the level of a Mach 1.8 design. A third approach incorporates a variable geometry inlet into an otherwise Mach 1.8 configuration so that efficient on-design inlet performance can be obtained from a range from Mach 1.6 to Mach 1.8, resulting in a small range penalty due to higher weight and higher losses inherent to the variable geometry inlet. Mach 1.6 performance of the third approach is further hindered due to increased inlet weight.

In a fourth approach, the inlet design Mach number is set such that a Mach 1.8 cruise can be attained in an over-speed condition with engine, subsystem, and aerodynamic design configured to maximize range at Mach 1.6. The illustrative concept does not operate on-design in a purest sense, although enabling the largest range of a fixed compression geometry inlet capable of cruising at Mach 1.8. Potentially, flight at a lower than design Mach number using the fixed geometry external compression engine and translating engine cowl can increase spillage drag and integrate the inlet and propulsion system in a manner that results in a higher drag.

An illustrative aircraft 900 can have inlets, engines, and an airframe generally designed for Mach 1.8 performance, and further includes optimizations to improve various performance aspects. The configuration enables cruising at a slightly lower Mach number than 1.8 to attain a higher range performance. In an illustrative embodiment, the wings are sized slightly larger than normal for a Mach 1.8 design to improve takeoff and landing performance.

The control elements operating the leading edge flap of strake 908, Krueger flap 910, and leading edge flap 912 can be controlled to further facilitate operation of aircraft 900 at off-design Mach numbers.

Figure 12:
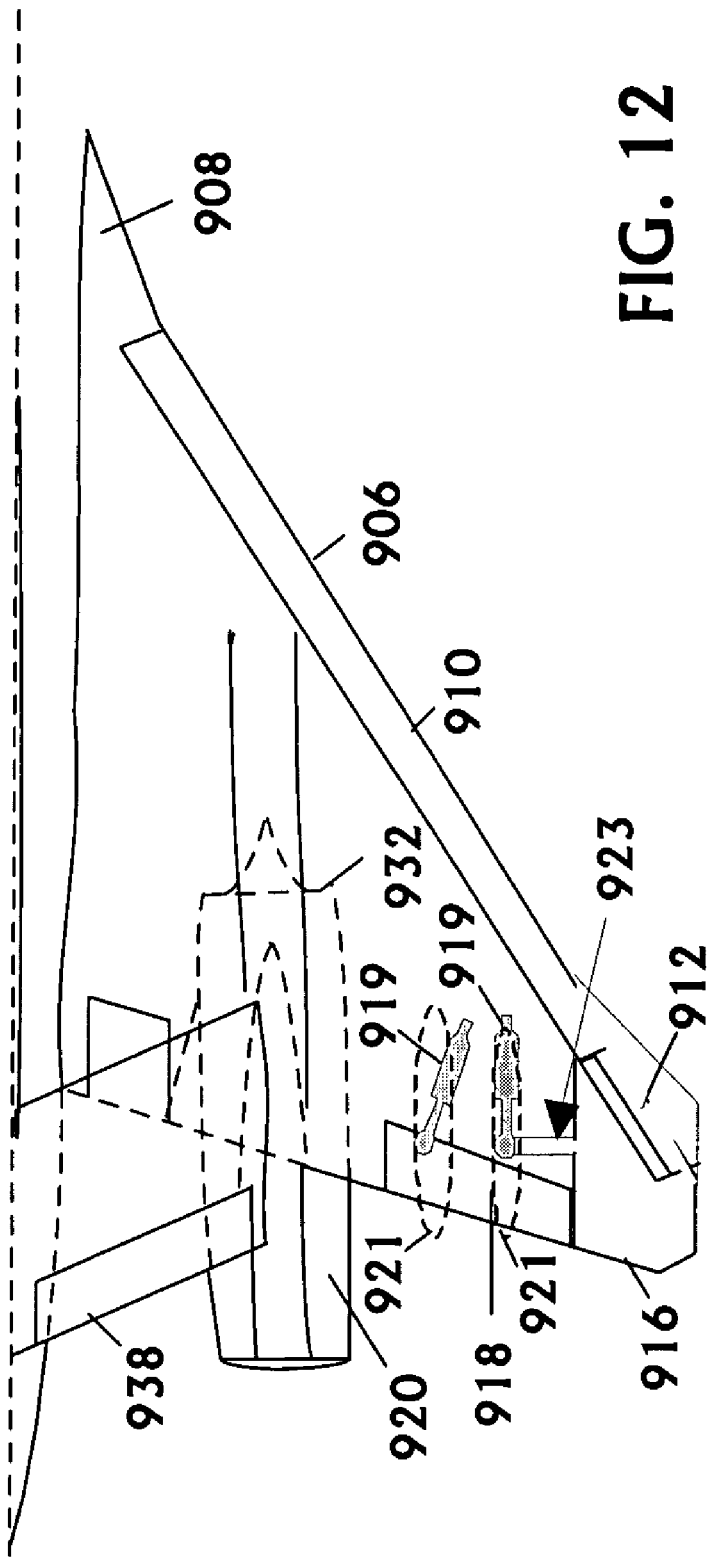
FIG. 12 depicts how the winglet may be used to achieve roll control.

FIG. 12 employs winglet 916 having an anhedral of about 30 degrees, typically outboard of the fuel extent. The resulting winglet's closer proximity to the ground intensifies the ground effect increasing lift, reducing drag and resulting in improved take-off performance. Further, George-Seebass-Darden minimization requires the aircraft lift to be carried aft, and because the Mach cone angle moves farther aft the higher the lift is carried vertically, dihedral raises the height of the wing as one goes outboard. Too much dihedral can make the aircraft roll during sideslip. To maximize the height of the wing for sonic boom minimization without saturating roll control during sideslip, the wing may have a higher inboard dihedral and an anhedraled wing tip. The tip takes advantage of its greater moment arm to counter the roll from greater inboard dihedral. By making greater inboard dihedral controllable, this anhedraled winglet improves sonic boom minimization. In addition, the winglet can capture a little more of the shock wave coming off the nacelle for drag reduction. Additional embodiments may incorporate an all-moving winglet with a rotational axis in the dihedral plane of the wing, to control roll with reduced aeroelastic effectiveness loss. This is especially true when operating supersonically. Such an all-moving winglet also results in less adverse yaw during roll conditions. High reliability actuators, like dual-tandem actuators 919 can be housed in streamwise upper surface wing bulge 921 to avoid interference with winglet 916 and nacelle. Upper surface actuators 919 with hinges located at the lower surface allow large hinge radii on the upper surface, where it is more useful for keeping control surface flow attached. The winglet incidence can be changed with rotation shaft 923 when the Mach number is changed from the design point to maximize drag reduction.

Figure 13A:
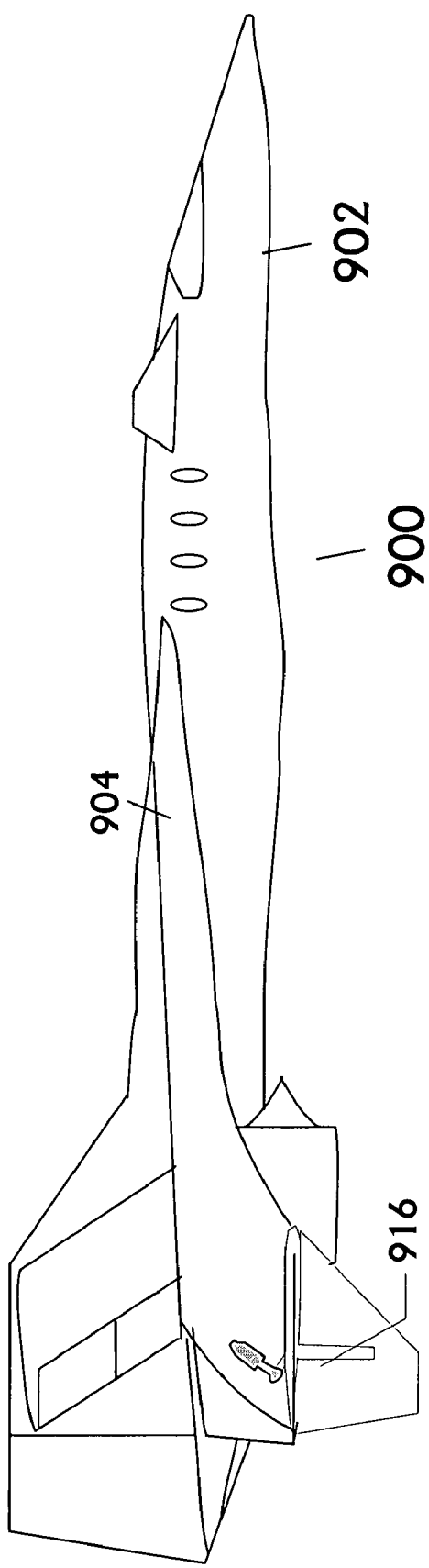
FIG. 13 depicts how the winglet may be utilized to achieve directional control.
Figure 13B:
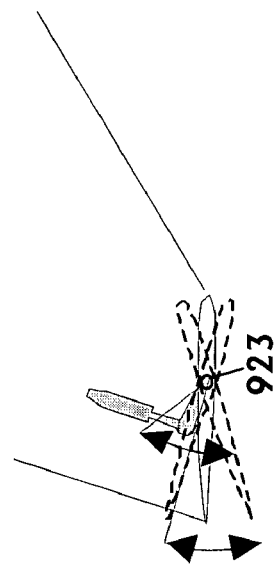

FIGS. 13A and 13B show winglet 916 having a dihedral of −60 to −90 or about +90 degrees. This winglet or a portion thereof, through rotation shaft 923 rotates about an axis perpendicular to the plane of the inboard portions of the wing 904. Actuator 919 can be placed in the axis of the wing spars. This embodiment allows increased yaw control from aft placed sideforces, and contributing drag differentials at winglets 916 due to the winglets or a combination of the winglets and ailerons. It could be possible to reduce or eliminate a larger center fin and rudder.

Figure 14:
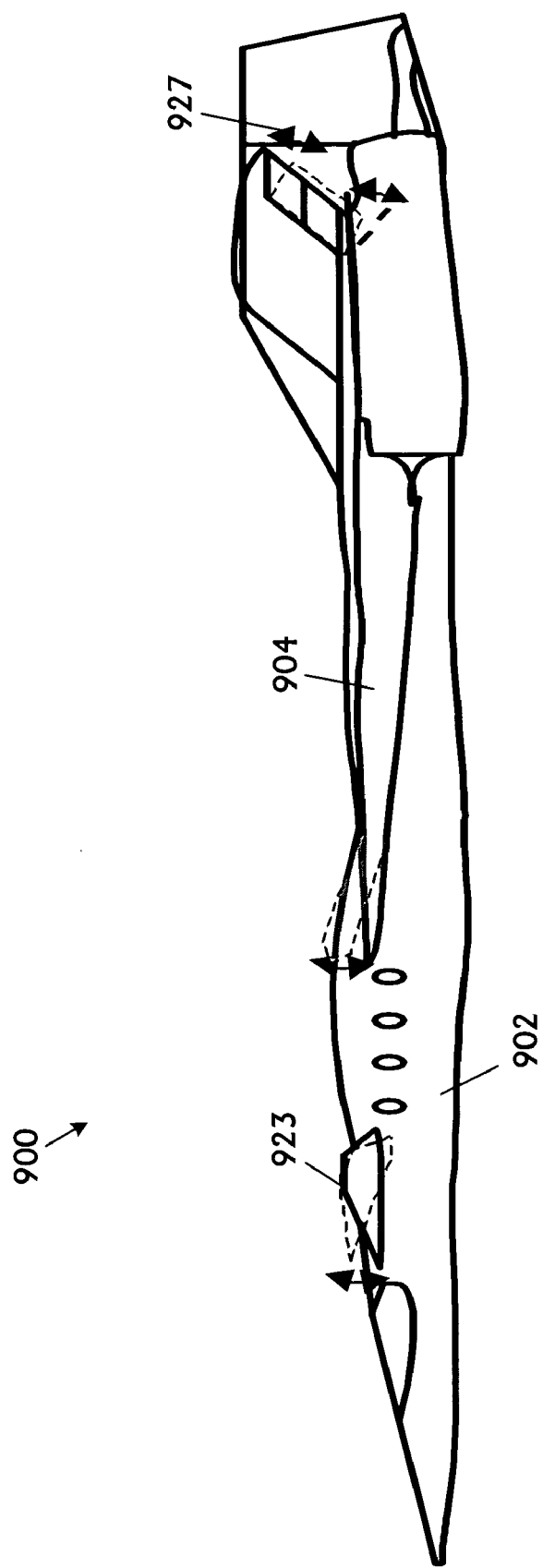
FIG. 14 is a graph of the equivalent area due to lift versus axial location.

The inboard section of wing 904 may have a higher leading edge sweep that is adjusted to fill-in the typical dip that occurs in the equivalent area just ahead of the wing. The spanwise extent of this higher swept region may be limited to the first 20 to 30 percent of span where a leading edge flap is not typically needed, to allow for a straighter leading edge flap. This higher inboard sweep can be separate or combined with the previous outboard wing sections. Canard 923 of FIG. 14 can also be used with or without the higher inboard sweep to fill-in the typical dip that occurs in the equivalent area just ahead of the wing.

Wing control surfaces 925, flaps 927, tails, and canards 923 can be used to meet sonic boom minimization requirements. By using movable surfaces to alter the lift distribution to meet sonic boom minimization requirements, resulting drag penalties do not have to be incurred wherever low sonic boom is not required, like over water. Since maximum range is generally most important over water, using movable surfaces for sonic boom minimization can reduce the drag penalty associated with reducing sonic boom.

Other mission-related characteristics facilitated by control of the leading edge surfaces include a capability to cruise at lower Mach numbers, and a tendency to cruise at lower altitudes at lower Mach numbers, resulting from an optimum lift coefficient occurring at lower altitude as a consequence of lower speed. Furthermore, suitable engines for the desired Mach performance typically produce lower specific fuel consumption at the lower altitudes. Also, lower cruise altitudes yield excess thrust at cruise, enabling a reduction is engine cruise thrust requirement and reduced engine weight. Additionally, lower cruise altitudes allow cruise to begin earlier and end later in a mission so that the aircraft spends proportionately more of a mission in a cruise condition. Also, lower cruise Mach numbers yield lower total air temperatures, benefiting engine and subsystem life. Lower cruise Mach numbers can also reduce emissions.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A supersonic aircraft comprising:
 a wing, wherein the wing further comprises:
  an inboard section of the wing adjacent to a fuselage;
  a central section of the wing outboard of the inboard section;
  an outboard winglet oriented anhedrally relative to a lateral axis of the supersonic aircraft and outboard of the central section of the wing;
  a leading edge formed from substantially linear leading edge segments on the central section and outboard winglet, wherein the leading edge segments include a leading edge flap mounted thereon, the leading edge flap of the central section comprises a Krueger flap and the leading-edge flap of the outboard winglet comprises a simple leading-edge flap, the Krueger flap on the central section of the wing includes a round leading edge radius that gradually blends to a sharp edge moving inboard to outboard along the leading edge, and the sharp edge conforms to the form of the simple leading-edge flap at a junction between the Krueger flap and the simple leading-edge flap; and
 a control system operable to reposition the leading edge flaps to improve aerodynamic performance of the supersonic aircraft.

2. The aircraft of claim 1, wherein the inboard section further includes:
 a trailing edge;
 a leading edge;
 a dihedral portion at the trailing edge; and
 a substantially non-dihedral portion at the leading edge.

3. The aircraft of claim 1, further comprising:
 a non-movable reflexed airfoil portion, wherein:
  the thickness of the reflexed airfoil portion converges from an intermediate location between the leading edge and the trailing edge of the wing, to the trailing edge of the wing,
  the shape of the reflexed airfoil portion is defined by at least one reflex angle, and
  the slope of the at least one reflex angle is greater than or equal to zero proximate the trailing edge of the wing.

4. The aircraft of claim 1, wherein the leading edge flap of the outboard winglet provides roll control at supersonic conditions and directional control with proverse roll effects.

5. The aircraft of claim 1, wherein the wing further comprises trailing-edge flaps on one or more sections, and wherein the leading edge flaps are controlled in conjunction with the trailing edge flaps by the control system to reduce drag at subsonic cruise conditions.

6. The aircraft of claim 1, wherein the leading edge flaps are dynamically controlled to increase aft lift, reduce trim and vortex drag, and reduce the sonic boom signature of the supersonic aircraft during supersonic flight.

7. The aircraft of claim 1, wherein the Krueger flap is located on the wing lower surface so that the curvature of the upper wing surface substantially matches the Krueger flap curvature for a desired deflection.

8. The aircraft of claim 1, wherein a strake leading-edge flap repositions to deflect or reduce lift ahead of spillage at an off-design condition and maintain a low sonic boom signature.

9. The aircraft of claim 1, further comprising a strake and a fuselage, the strake coupling to the fuselage and extending to the leading edge of the wing, wherein the wing and strake form a swept wing that extends in a plurality of sweep angle segments from the fuselage, the sweep angle of the inboard portion of the wing differs from the sweep angle of the strake and outboard winglet.

10. The aircraft of claim 1, wherein the outboard winglet is configured to increase ground effect during take off.

11. The aircraft of claim 1, wherein the dihedral portion is configured to accommodate forward-retracting main landing gear.

12. The aircraft of claim 1, wherein the control system couples to the leading edge flaps and adjusts the leading-edge flaps to improve aerodynamic flow fields for flight at Mach numbers different from the Mach number to which the aircraft design is optimized.

* * * * *